United States Patent
Lakshminarayanan et al.

(10) Patent No.: US 11,562,373 B2
(45) Date of Patent: Jan. 24, 2023

(54) UTILIZING MACHINE LEARNING MODELS, PREDICTIVE ANALYTICS, AND DATA MINING TO IDENTIFY A VEHICLE INSURANCE FRAUD RING

(71) Applicant: Accenture Global Solutions Limited, Dublin (IE)

(72) Inventors: Subhashini Lakshminarayanan, Chennai (IN); Gopali Raval Contractor, Mumbai (IN); Shantanu Ss, Mumbai (IN)

(73) Assignee: Accenture Global Solutions Limited, Dublin (IE)

(*) Notice: Subject to any disclaimer, the term of this patent is extended or adjusted under 35 U.S.C. 154(b) by 190 days.

(21) Appl. No.: 16/986,608

(22) Filed: Aug. 6, 2020

(65) Prior Publication Data
US 2022/0044256 A1    Feb. 10, 2022

(51) Int. Cl.
| | |
|---|---|
| *G06Q 30/00* | (2012.01) |
| *G06F 40/00* | (2020.01) |
| *G06N 3/04* | (2006.01) |
| *G06N 3/08* | (2006.01) |
| *G06Q 10/00* | (2012.01) |
| *G06Q 10/10* | (2012.01) |
| *G06Q 30/02* | (2012.01) |
| *G06Q 40/08* | (2012.01) |

(Continued)

(52) U.S. Cl.
CPC ......... *G06Q 30/0185* (2013.01); *G06F 40/40* (2020.01); *G06N 3/0445* (2013.01); *G06N 3/0454* (2013.01); *G06N 3/088* (2013.01); *G06Q 10/10* (2013.01); *G06Q 10/20* (2013.01); *G06Q 30/0205* (2013.01); *G06Q 40/08* (2013.01); *G06Q 50/01* (2013.01); *G06Q 50/265* (2013.01)

(58) Field of Classification Search
CPC .............. G06Q 30/0185; G06Q 10/10; G06Q 30/0205; G06Q 40/08; G06F 40/40; G06F 40/279; G06F 40/30; G06N 3/0454
USPC .......................................................... 705/4
See application file for complete search history.

(56) References Cited

U.S. PATENT DOCUMENTS

| | | | | |
|---|---|---|---|---|
| 6,330,546 B1 * | 12/2001 | Gopinathan | ........... | G06Q 40/00 705/38 |
| 7,376,618 B1 * | 5/2008 | Anderson | .............. | G06Q 40/08 705/38 |

(Continued)

*Primary Examiner* — Clifford B Madamba
(74) *Attorney, Agent, or Firm* — Harrity & Harrity, LLP

(57) ABSTRACT

A device may consolidate the input data associated with vehicle insurance claims to generate processed input data. The device may process claims data, treatment data, and repair shop data to resolve ambiguities in the processed input data and to generate resolved data. The device may process the resolved data to generate related data identifying relations between persons and vehicle accidents. The device may process notes of claims adjusters and vehicle accident descriptions to extract feature data identifying features. The device may process the feature data to determine contradiction data identifying contradictions in the feature data. The device may process weather data, location data, and telematics data to determine weather conditions and locations associated with the accidents. The device may process the related data, the contradiction data, the weather conditions, and the locations to generate a knowledge graph. The device may identify a fraud ring based on the knowledge graph.

20 Claims, 15 Drawing Sheets

(51) Int. Cl.
  *G06Q 50/00*  (2012.01)
  *G06Q 50/26*  (2012.01)
  *G06F 40/40*  (2020.01)

(56) References Cited

U.S. PATENT DOCUMENTS

| | | | | |
|---|---|---|---|---|
| 7,716,329 B2* | 5/2010 | Lee | ............... | H04L 63/1425 |
| | | | | 709/224 |
| 7,813,944 B1* | 10/2010 | Luk | ............... | G06Q 10/10 |
| | | | | 705/2 |
| 2016/0379309 A1* | 12/2016 | Shikhare | ............... | G06Q 40/08 |
| | | | | 705/4 |
| 2022/0147934 A1* | 5/2022 | Chandrashekar | ....... | G06F 40/30 |

\* cited by examiner

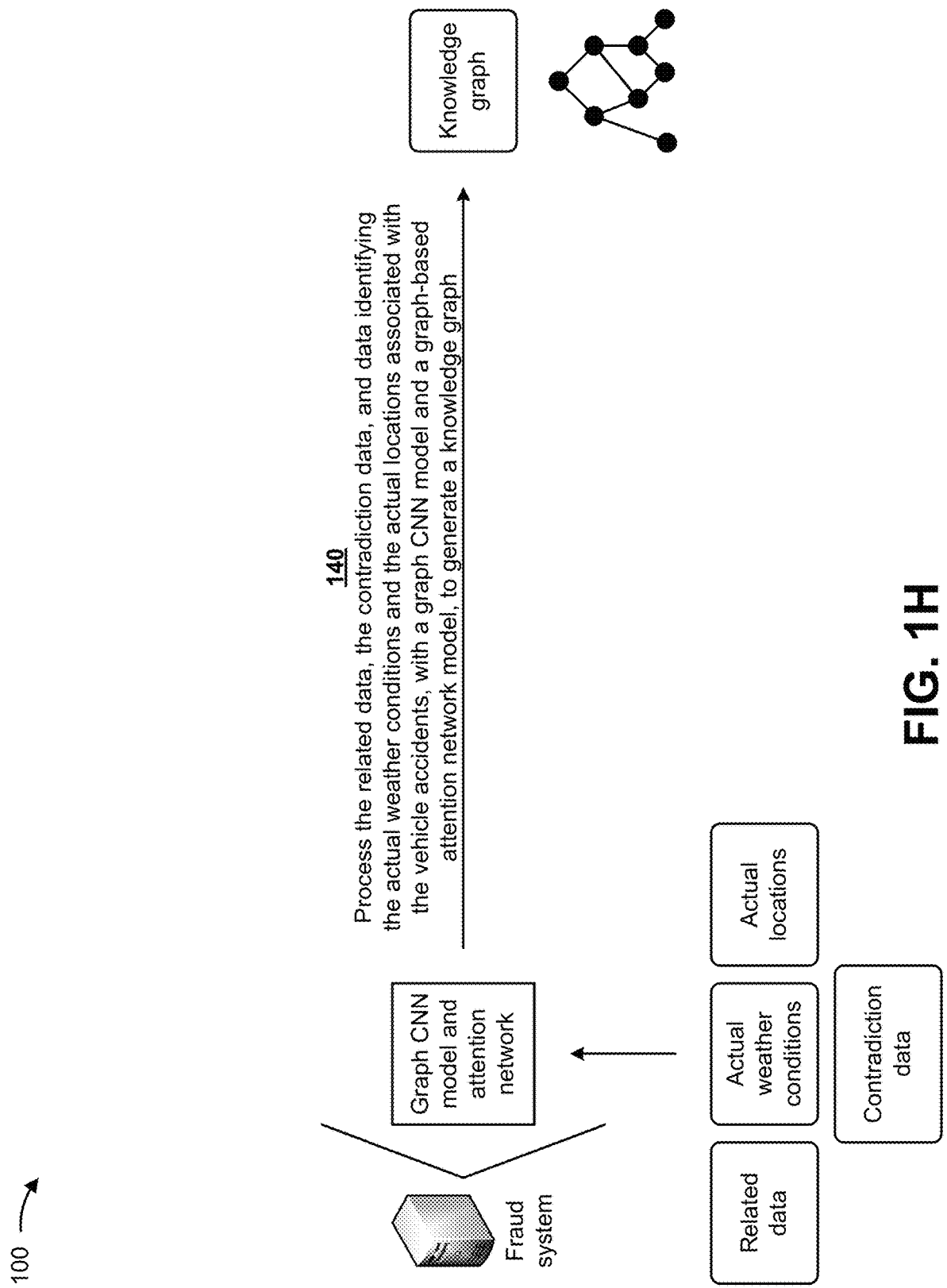

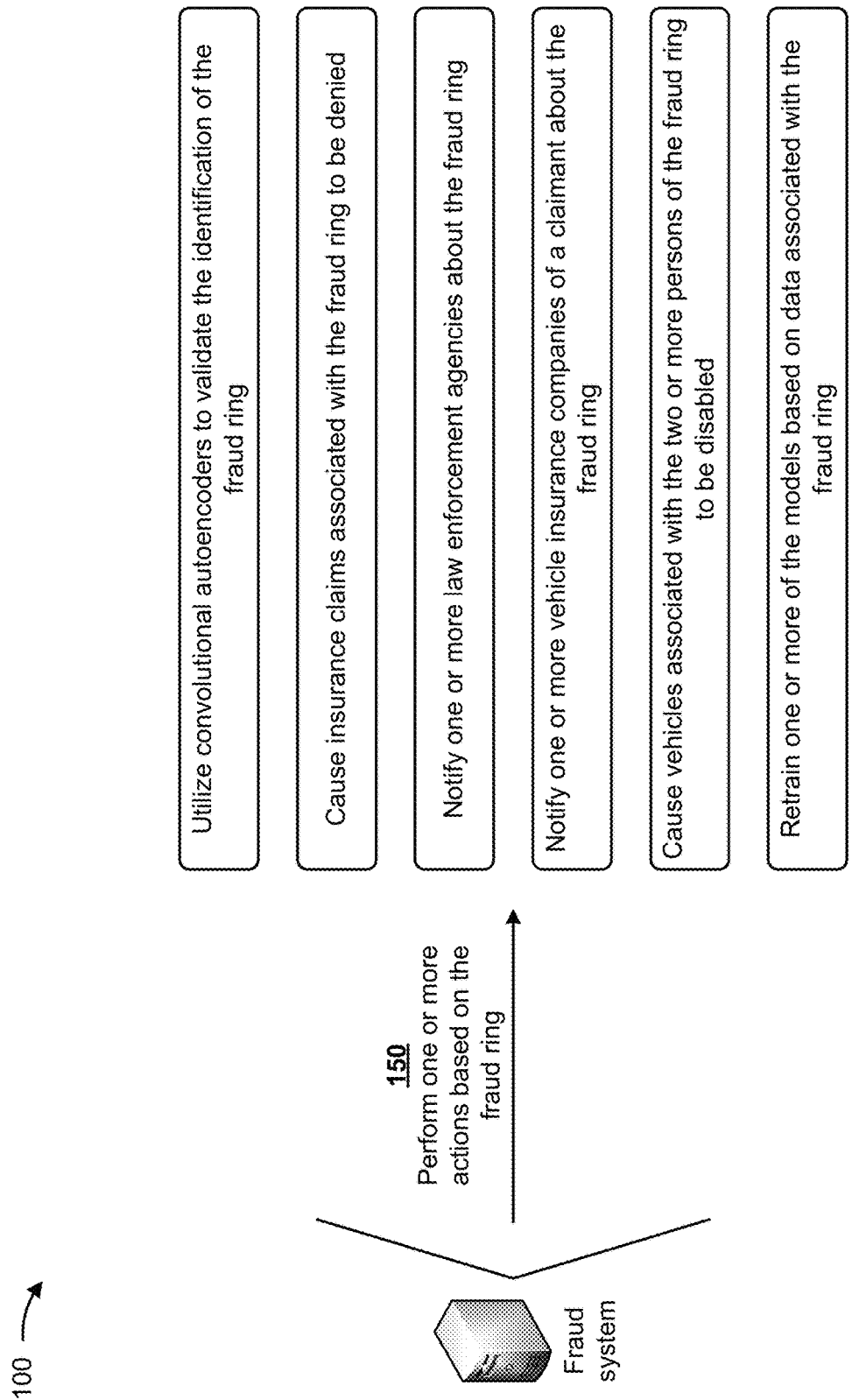

UTILIZING MACHINE LEARNING MODELS, PREDICTIVE ANALYTICS, AND DATA MINING TO IDENTIFY A VEHICLE INSURANCE FRAUD RING

BACKGROUND

Insurance fraud is an act committed to defraud an insurance process. For example, insurance fraud may occur when a claimant attempts to obtain some benefit or advantage the claimant is not entitled to, or when an insurance company knowingly denies some benefit that is rightfully due to a claimant.

SUMMARY

In some implementations, a method includes receiving, by a device, input data associated with vehicle insurance claims; consolidating and pre-processing, by the device, the input data to generate processed input data; processing, by the device, claims data, social media data, treatment data, and repair shop data, of the processed input data, with a long short-term memory model and a conditional random field model, to resolve ambiguities in the processed input data and to generate resolved data; processing, by the device, the resolved data, with a neural network model, to generate related data identifying relations between persons and vehicle accidents; performing, by the device, natural language processing on notes of claims adjusters and vehicle accident descriptions, of the resolved data, to extract feature data identifying features; processing, by the device, the feature data, with a convolutional neural network (CNN) model, to determine contradiction data identifying contradictions in the feature data; processing, by the device, weather data, location data, and telematics data, of the processed input data, with a graph-based entropy model, to determine actual weather conditions and actual locations associated with the vehicle accidents; processing, by the device, the related data, the contradiction data, and data identifying the actual weather conditions and the actual locations associated with the vehicle accidents, with a graph CNN model and a graph-based attention network model, to generate a knowledge graph; identifying, by the device and based on the knowledge graph, a fraud ring associated with two or more persons; and performing, by the device, one or more actions based on identifying the fraud ring.

In some implementations, a device includes one or more memories; and one or more processors, communicatively coupled to the one or more memories, configured to: receive input data associated with vehicle insurance claims; process claims data, social media data, treatment data, and repair shop data, of the input data, with a first model and a second model, to resolve ambiguities in the input data and to generate resolved data; process the resolved data, with a third model, to generate related data identifying relations between persons and vehicle accidents; perform natural language processing on notes of claims adjusters and vehicle accident descriptions, of the resolved data, to extract feature data identifying features; process the feature data, with a fourth model, to determine contradiction data identifying contradictions in the feature data; process weather data, location data, and telematics data, of the input data, with a fifth model, to determine actual weather conditions and actual locations associated with the vehicle accidents; process the related data, the contradiction data, and data identifying the actual weather conditions and the actual locations associated with the vehicle accidents, with a sixth model and a seventh model, to generate a knowledge graph; determine, based on the knowledge graph, a fraud ring associated with two or more persons; and perform one or more actions based on the fraud ring.

In some implementations, a non-transitory computer-readable medium storing instructions includes one or more instructions that, when executed by one or more processors, cause the one or more processors to: receive input data associated with vehicle insurance claims; process claims data, social media data, treatment data, and repair shop data, of the input data, with a long short-term memory model and a conditional random field model, to resolve ambiguities in the input data and to generate resolved data; process the resolved data, with a neural network model, to generate related data identifying relations between persons and vehicle accidents; perform natural language processing on notes of claims adjusters and vehicle accident descriptions, of the resolved data, to extract feature data identifying features; process the feature data, with a CNN model, to determine contradiction data identifying contradictions in the feature data; process weather data, location data, and telematics data, of the input data, with a graph-based entropy model, to determine actual weather conditions and actual locations associated with the vehicle accidents; process the related data, the contradiction data, and data identifying the actual weather conditions and the actual locations associated with the vehicle accidents, with a graph CNN model and a graph-based attention network model, to generate a knowledge graph; identify, based on the knowledge graph, a fraud ring associated with two or more persons; utilize convolutional autoencoders to determine a reconstructed fraud ring; compare data identifying the fraud ring and data identifying the reconstructed fraud ring; and determine whether the fraud ring is valid based on comparing the data identifying the fraud ring and the data identifying the reconstructed fraud ring.

BRIEF DESCRIPTION OF THE DRAWINGS

FIGS. 1A-1K are diagrams of an example implementation described herein.

DETAILED DESCRIPTION

Figure 1A:
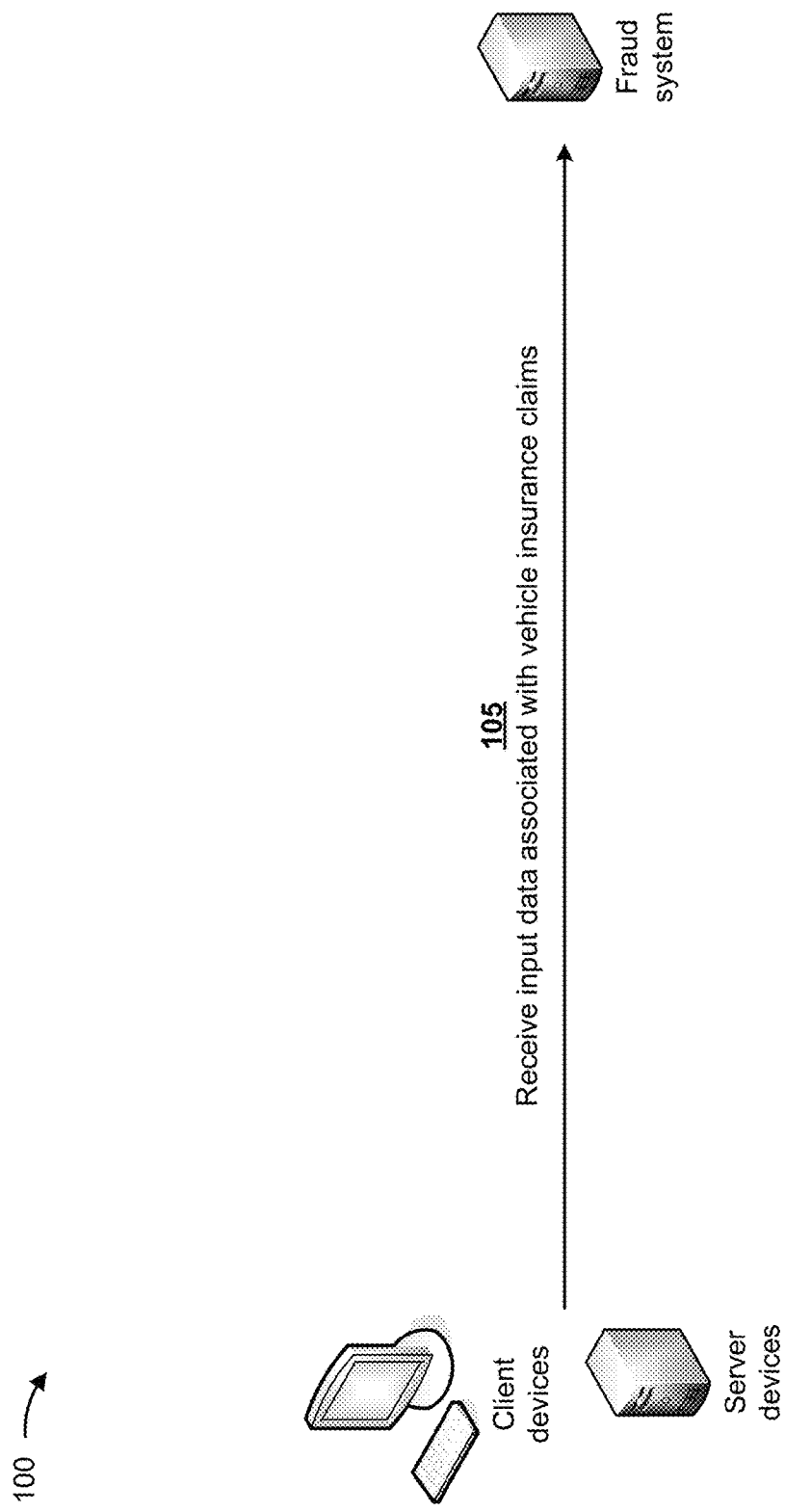

The following detailed description of example implementations refers to the accompanying drawings. The same reference numbers in different drawings may identify the same or similar elements.

An individual may make a fraudulent insurance claim in connection with an insurance policy owned by the individual. For example, the individual may stage a traffic accident, may inflate an estimate of a cost to repair damage to an insured item (e.g., a vehicle, a home, and/or the like), may submit a fraudulent policy report, and/or the like.

An insurance company associated with the insurance policy may receive the insurance claim. If the insurance company suspects that the insurance claim is a fraudulent insurance claim, the insurance company may assign the insurance claim to an investigator. The investigator may perform an investigation to determine whether the insurance claim is a fraudulent insurance claim. In some cases, the complexity of the circumstances surrounding the insurance claim (e.g., the injuries suffered by the claimant, the quantity of individuals the investigator may need to interview, the availability of the individuals the investigator may need to interview, and/or the like) may cause the investigation to take a relatively long time (e.g., weeks, months, and/or the like).

In some cases, the individual may collaborate with a group of individuals (e.g., a fraud ring) to submit multiple fraudulent insurance claims involving multiple, unrelated accidents, to the insurance company. When each insurance claim is reviewed by the insurance company and/or investigated by the investigator individually, each insurance claim may appear to be a valid insurance claim. Thus, investigating each insurance claim individually may result in the waste of computing resources (e.g., processing resources, memory resources, communication resources, and/or the like) utilized to investigate the insurance claims individually.

Further, the insurance company may receive hundred, thousands, or tens of thousands insurance claims per year. The large number of insurance claims received by the insurance company may prevent the insurance claims from being analyzed as a group to determine patterns, connections, or similarities between the insurance claims that may show that the insurance claims are fraudulent. Because the insurance company is unable to identify the fraudulent insurance claims, the insurance company may process the fraudulent insurance claims thereby wasting time, money, and computing resources (e.g., processing resources, memory resources, communication resources, and/or the like) that would otherwise have been conserved if the insurance claims had been denied based on the insurance company determining that the insurance claims were fraudulent insurance claims. Further, in cases where the insurance company does identify an insurance claim as a fraudulent insurance claim, the insurance company may not be able to identify all of the individuals included in the fraud ring.

Some implementations described herein relate to a fraud system that utilizes machine learning models, predictive analytics, and data mining to identify a vehicle insurance fraud ring. For example, the fraud system may receive input data associated with insurance claims. The fraud system may consolidate and pre-process the input data to generate processed input data. The fraud system may process claims data, social media data, treatment data, and repair shop data, of the processed input data, with a long short-term memory model and a conditional random field model, to resolve ambiguities in the processed input data and to generate resolved data.

In some implementations, the fraud system may process the resolved day with a neural network model to generate related data. The related data may identify relationships between individuals and accidents related to the insurance claims. The fraud system may perform natural language processing on notes of claims adjusters and written descriptions of the accidents included in the resolved data to extract feature data identifying features.

In some implementations, the fraud system may process the feature data with a convolutional neural network (CNN) model to determine contradiction data identifying contradictions in the feature data. The fraud system may process weather data, location data, and telematics data associated with the processed input data with a graph-based entropy model to determine actual weather conditions and actual locations associated with the accidents. The fraud system may process the related data, the contradiction data, and data identifying the actual weather conditions and the actual locations associated with the vehicle accidents, with a graph CNN model and a graph-based attention network model, to generate a knowledge graph. The fraud system may identify, based on the knowledge graph, a fraud ring associated with two or more persons associated with submitting fraudulent insurance claims.

In this way, the fraud system may enable large quantities of insurance claims (e.g., hundreds, thousands, or event tens of thousands of insurance claims) to be analyzed as a group thereby allowing the fraud system to identify a fraud ring based on determining relationships and contradictions associated with data associated with insurance claims. In this way, the fraud system may conserve computing resources that otherwise would have been wasted by analyzing the insurance claims individually.

Although some implementations described herein may be described in relation to vehicle insurance claims, the implementations described herein are not limited to vehicle insurance claims. The implementations described herein may be related to other types of insurance claims, such as medical insurance claims, property insurance claims, and/or the like.

FIGS. 1A-1K are diagrams of one or more example implementations 100 described herein. As shown in FIGS. 1A-1K, implementations 100 include client devices and server devices associated with a fraud system. A client device, of the client devices, may include a mobile device, a computer, and/or the like that is configured to provide information associated with an insurance claim to the server devices and/or the fraud system, as described herein.

In some implementations, the client device is located on a vehicle and is configured to obtain telematics data (e.g., data identifying a location of the vehicle, data identifying a speed of the vehicle, data identifying an acceleration of the vehicle, data identifying a rotations per minute (RPM) of an engine of the vehicle, image data of a view proximate to the vehicle, and/or the like) associated with the operation of the vehicle. For example, the client device may include a global positioning system (GPS) device, a radar, a LIDAR, an accelerometer, a dash cam, a sensor included in an autonomous driving system of the vehicle, and/or the like.

A server device, of the server devices, may include one or more computing devices that are configured to receive, provide, store, and/or process data associated with an insurance claim, as described herein. In some implementations, the server devices include an insurance provider server device. The service provider server device may be associated with an insurance provider and may store claims data. The claims data may include information associated with an insurance claim. For example, the claims data may include information identifying a claimant associated with the insurance claim, information identifying a witness associated with the insurance claim, an identifier associated with the insurance claim, information identifying a vehicle associated with the insurance claim, information identifying a monetary amount claimed by the claimant, notes made by a claim adjuster, information describing the accident, and/or the like.

In some implementations, the server devices include a social network server device. The social network server device may be associated with a social network and may store social media data. The social media data may include information provided by a user of the social network, such as information associated with an insurance claim. For example, the server device may store pictures of a location of an accident related to an insurance claim, messages to and/or from the user that include information associated with an insurance claim, and/or the like.

In some implementations, the server devices include a medical provider server device. The medical provider server device may be associated with a medical provider and may store treatment data. The treatment data may include information identifying an injury suffered by a person associated with an insurance claim, information identifying a treatment prescribed to the person, information identifying a cost of the treatment, information identifying a date of the treatment, information identifying statements provided by the person regarding the injury, and/or the like.

In some implementations, the server devices include a repair shop server device. The repair shop server device may be associated with an entity (e.g., a person, a business, and/or the like) associated with repairing damaged property, estimating a cost to repair damaged property, determining a value of damaged property, and/or the like. The repair shop server device may store repair shop data. The repair shop data may include information associated with repairing damaged property, information associated with estimating a cost to repair damaged property, information associated with a value of damaged property, information identifying an owner of the property, information identifying a date damage property was repaired and/or replaced, an image of the damaged property, an image of the repaired property, and/or the like.

In some implementations, the server devices include a weather server device. The weather server device may be associated with a weather service and may store weather data. The weather data may include weather information associated with an insurance claim. For example, the weather data may include information identifying a weather condition occurring on a date of an accident associated with the insurance claim (e.g., overcast, sunny, snowing, and/or the like), information identifying a temperature on the date of the accident, information identifying a time at which sunset and/or sunrise occurred on the date of the accident, and/or the like.

The fraud system may include one or more devices that utilize claims data, social media data, treatment data, repair shop data, weather data, and/or the like and one or more machine learning models (referred to herein singularly as a "model" and plurally as "models") to identify a fraud ring associated with two or more persons and/or one or more entities associated with submitting fraudulent vehicle insurance claims.

In some implementations, the fraud system is configured to extract and process data from streaming data sources and batch data sources using big data tools. In some implementations, the fraud system includes one or more bulk data sources (e.g., batch/file data sources), streaming data sources (e.g., Kafka), analytics engines (e.g., Apache Spark, Oracle R, or the like), data lakes (e.g., Hadoop Distributed File System (HDFS)/Hbase/Impala), data warehouses (DWH)/relational database management systems (RDBMS), application programming interfaces (API) (e.g., data abstraction layers), and/or visualization layers (e.g., dashboards).

A data lake may be capable of extracting and processing bulk data from a bulk data source and streaming data from a streaming data source. The data lake also may be capable of storing data objects associated with the bulk data and the streaming data. The data lake also may be capable of providing the processed data to a DWH/RDBMS, which may serve as a central store for the data objects. The data lake also may be capable of providing the processed data to an analytics engine, which may perform distributed calculation and handling of the data from the bulk data source, data from the streaming data source, data objects from the data lake, and/or data from the DWH/RDBMS. The data lake and the DWH/RDBMS also may be capable of providing data to an API, which may be used to provide routines, protocols, and tools for programming a visualization layer for users of the fraud system.

As shown in FIG. 1A, and be reference number 105, the fraud system receives input data associated with vehicle insurance claims from the client devices and/or the server devices. In some implementations, the fraud system receives the input data from client devices and/or server devices associated with claimants associated with the vehicle insurance claims. The input data may include telematics data received from a client device, claims data received from an insurance provider server device, social media data received from a social network server device, treatment data received from a medical provider insurance device, repair shop data received from a repair shop server device, weather data received from a weather server device, and/or the like. In some implementations, the fraud system receives the input data based on an occurrence of an event. For example, the fraud system may receive the input data based on a user utilizing the client device to submit a vehicle insurance claim. The vehicle insurance claim may include claims data associated with an accident related to the vehicle insurance claim. The user may utilize the client device to submit the vehicle insurance claim to an insurance provider via the insurance provider server device. The insurance provider server device may receive the vehicle insurance claim and may provide the claims data included in the vehicle insurance claim to the fraud system.

In some implementations, the fraud system may receive telematics data, the social media data, the treatment data, the repair shop data, and the weather data based on receiving the claims data. The fraud system may analyze the claims data to determine entities associated with the vehicle insurance claim. For example, the fraud system may analyze the claims data to determine a claimant associated with the vehicle insurance claim, an insured party associated with the vehicle insurance claim, property associated with the insurance claim, a date associated with the insurance claim, a location associated with the insurance claim, a witness associated with the insurance claim, a repair shop associated with the insurance claim, a medical provider associated with the insurance claim, and/or the like.

The fraud system may query the client devices and/or the server devices to obtain input data associated with the entities and/or the insurance claim. For example, the fraud system may obtain telematics data from a client device associated with the claimant and/or the insured party (e.g., a device included on a vehicle involved in an accident associated with the insurance claim, a mobile device associated with the claimant and/or the insured party, and/or the like). The fraud system may query the social media server device to obtain social media data associated with the claimant, the witness, the property, and/or the like. The fraud system may query the medical provider server device to obtain treatment data associated with the claimant and/or another individual associated with the insurance claim (e.g., the insured individual). The fraud system may query the repair shop server device to obtain repair shop data associated with the property. The fraud system may query the weather server device to obtain weather data for the date associated with the insurance claim.

Figure 1B:
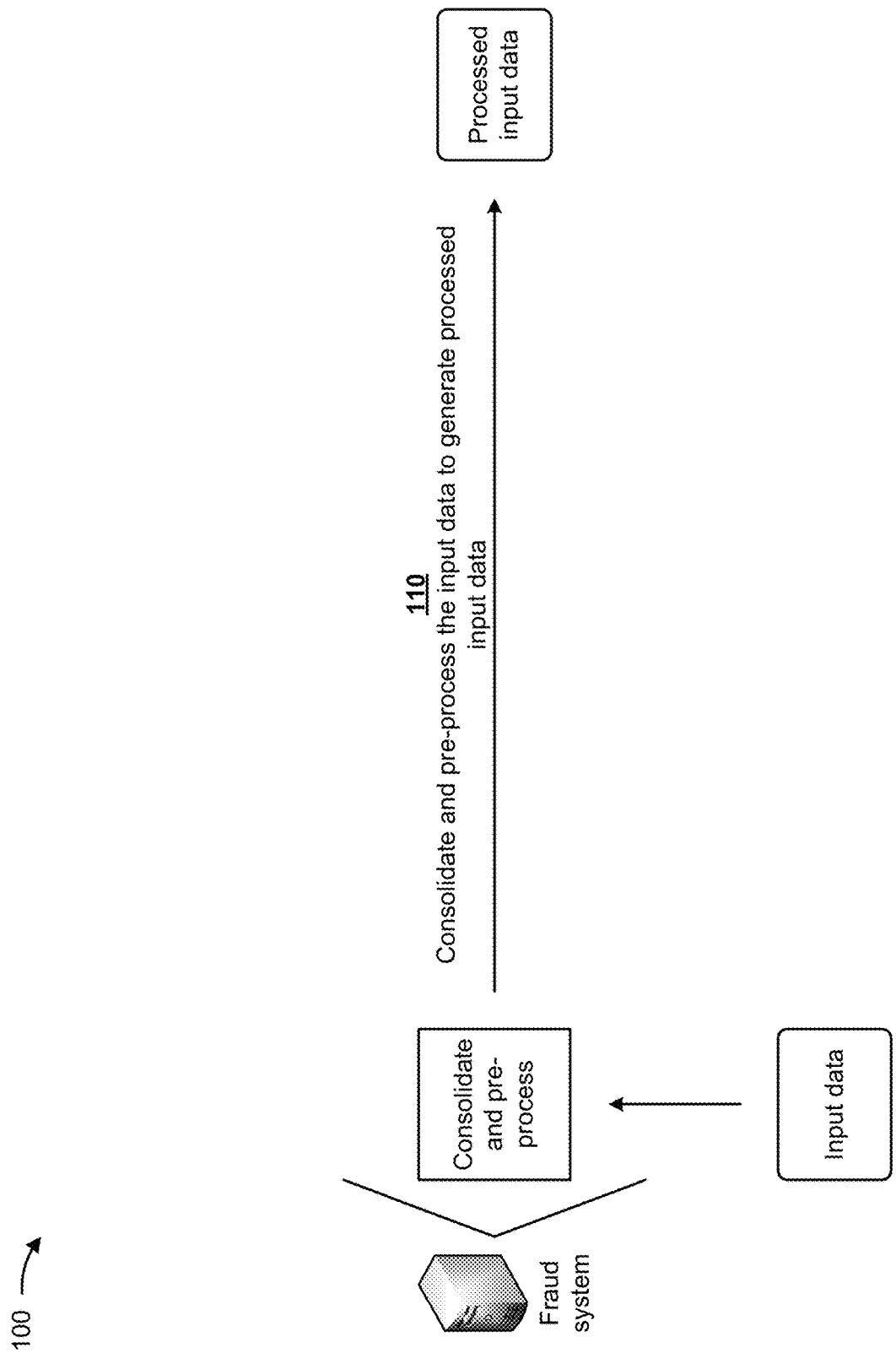

As shown in FIG. 1B, and by reference number 110, the fraud system consolidates and pre-processes the input data to generate processed input data. The processed input data may include enriched existing and/or available data for machine reading. The fraud system may consolidate the input data by storing the input data in a central repository associated with the fraud system. The central repository may include one or more devices configured to store structured and/or unstructured data.

In some implementations, the fraud system consolidates the input data based on a type of the input data. The fraud system may obtain claims data from a plurality of insurance provider server devices. The fraud system may consolidate the claims data by storing the claims data in a data structure associated claims data based on receiving the claims data from the plurality of insurance provider server devices. The fraud system may consolidate the telematics data, the social media data, the treatment data, the repair shop data, the weather data, and/or the like in a manner similar to that described above.

In some implementations, the fraud system pre-processes the input data prior to consolidating the input data. For example, the fraud system may pre-process the input data based on receiving the input data from the client devices and/or based on receiving the input data from the server devices. Alternatively, and/or additionally, the fraud system pre-processes the data based on consolidating the input data.

The fraud system may utilize one or more pre-processing techniques to pre-process the input data, such as a data cleansing technique, a data reduction technique, a data transformation technique, and/or the like. The fraud system may select the one or more pre-processing techniques based on a variety of factors, such as a type associated with the input data (e.g., video data, image data, text data, structured data, unstructured data, and/or the like), whether a source of the input data (e.g., one or the server devices) provides voluminous data that needs to be cleaned and/or reduced in size, whether the input data is provided in a format that is to be converted into a particular format that is utilized by the fraud system, and/or the like.

The data cleansing technique may include a technique that detects and corrects corrupt or inaccurate records included in the input data, that identifies incomplete, incorrect, inaccurate, and/or irrelevant portions of the input data. For example, the data cleansing technique may identify a portion of the input data corresponding to an user entry error, input data corrupted during transmission or storage of the input data, and/or the like. The data cleansing technique may cleanse the input data by replacing, modifying, and/or deleting the identified portion of the input data.

The data reduction technique may include a technique that transforms numerical or alphabetical information into a corrected, ordered, and simplified form, and reduces a quantity of the input data into meaningful parts. In some implementations, the data reduction technique may reduce a size of the input data by merging duplicate records included in the input data into a single record, removing white spaces from textual data included in the input data, and/or the like.

The data transformation technique may include a technique that converts the input data from one format or structure into another format or structure. The data transformation may be simple or complex based on required changes to the input data between source (e.g., initial) data and target (e.g., final) data.

Figure 1C:
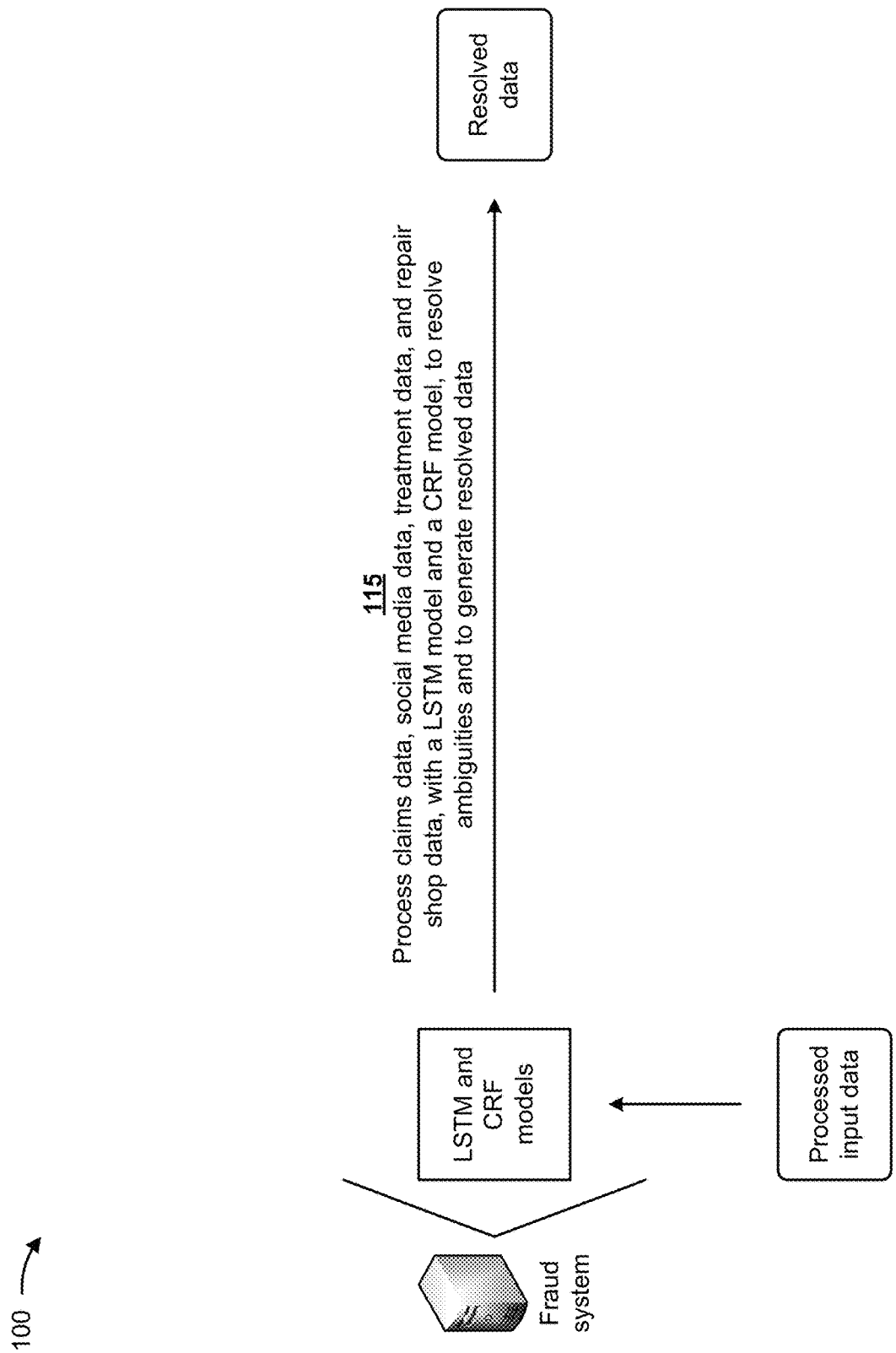

As shown in FIG. 1C, and by reference number 115, the fraud system processes the claims data, the social media data, the treatment data, and the repair shop data, with a long short term memory (LSTM) model and a conditional random field (CRF) model, to resolve ambiguities and generate resolved data. In some implementations, the fraud system may train and/or utilize the LSTM model and/or the CRF model in a manner similar to that described below with respect to FIG. 2.

The LSTM model may include a recurrent neural network architecture that performs a named entity recognition process to determine a named entity (e.g., Bob Smith, Virginia, Company A, driver, and/or the like) identified in the claims data, the social media data, the treatment data, and/or the repair shop data.

The CRF model may be a discriminative, undirected, probabilistic, graphical model that analyzes the claims data, the social media data, the treatment data, and the repair shop data to predict a classification (e.g., person, claimant, insured, location, vehicle, organization, role (e.g., claimant, insured, witness, driver, passenger, medical provider, repairman, and/or the like), and/or the like) associated with each named entity determined by the LSTM model. As an example, the CRF model may analyze an insurance claim included in the claims data to determine a context associated with the named entity Bob Smith. For example, the CRF model may determine that the insurance claim includes the word claimant within a threshold quantity of words prior to the named entity Bob Smith, that a claimant is a person, that Bob Smith is a name of a person, and/or the like. The CRF model may predict a classification of a person and/or claimant for the named entity Bob Smith based on the insurance claim including the word claimant within the threshold quantity of words prior to the named entity Bob Smith, that a claimant is a person, that Bob Smith is a name of a person, and/or the like.

In some implementations, the fraud system generates a co-resolution matrix based on the named entities and/or the classifications. The co-resolution matrix may include a plurality of rows and a plurality of columns. The plurality of rows and the plurality of columns may intersect to form a plurality of entries. Each row, of the plurality of rows, may represent a respective named entity, of the named entities. Similarly, each column, of the plurality of columns may represent a respective named entity, of the named entities. An entry, of the plurality of entries, may include a value representing a similarity between the named entity represented by the row that includes the entry and the named entity represented by the column that includes the entry.

As an example, a first row may represent a first named entity and a second column may represent a second named entity. The entry included in the first row and the second column may include a value indicating a similarity between the first named entity and the second named entity.

In some implementations, the fraud system determines the value based on a Levenshtein distance between the first named entity and the second named entity. The fraud system may calculate the Levenshtein distance based on a minimum quantity of single character edits (e.g., an insertion of a character, a deletion of a character, a substitution of a character, and/or the like) that are required to be made to cause the first named entity and the second named entity to match.

The fraud system may determine that an ambiguity exists between the first named entity and the second named entity based on the similarity between the first named entity and the second named entity. As an example, the fraud system may determine that the Levenshtein distance determined for the first named entity and the second named entity satisfies a threshold. The fraud system may determine that the ambiguity exists based on the Levenshtein distances satisfying the threshold.

The fraud system may resolve the ambiguity based on determining that the ambiguity exists. The fraud system may resolve the ambiguity to generate the resolved data by replacing the first named entity and/or the second named entity with a common identifier (e.g., the first named entity, the second named entity, a third named entity, and/or the like), associating the first named entity with the second named entity, and/or the like.

Figure 1D:
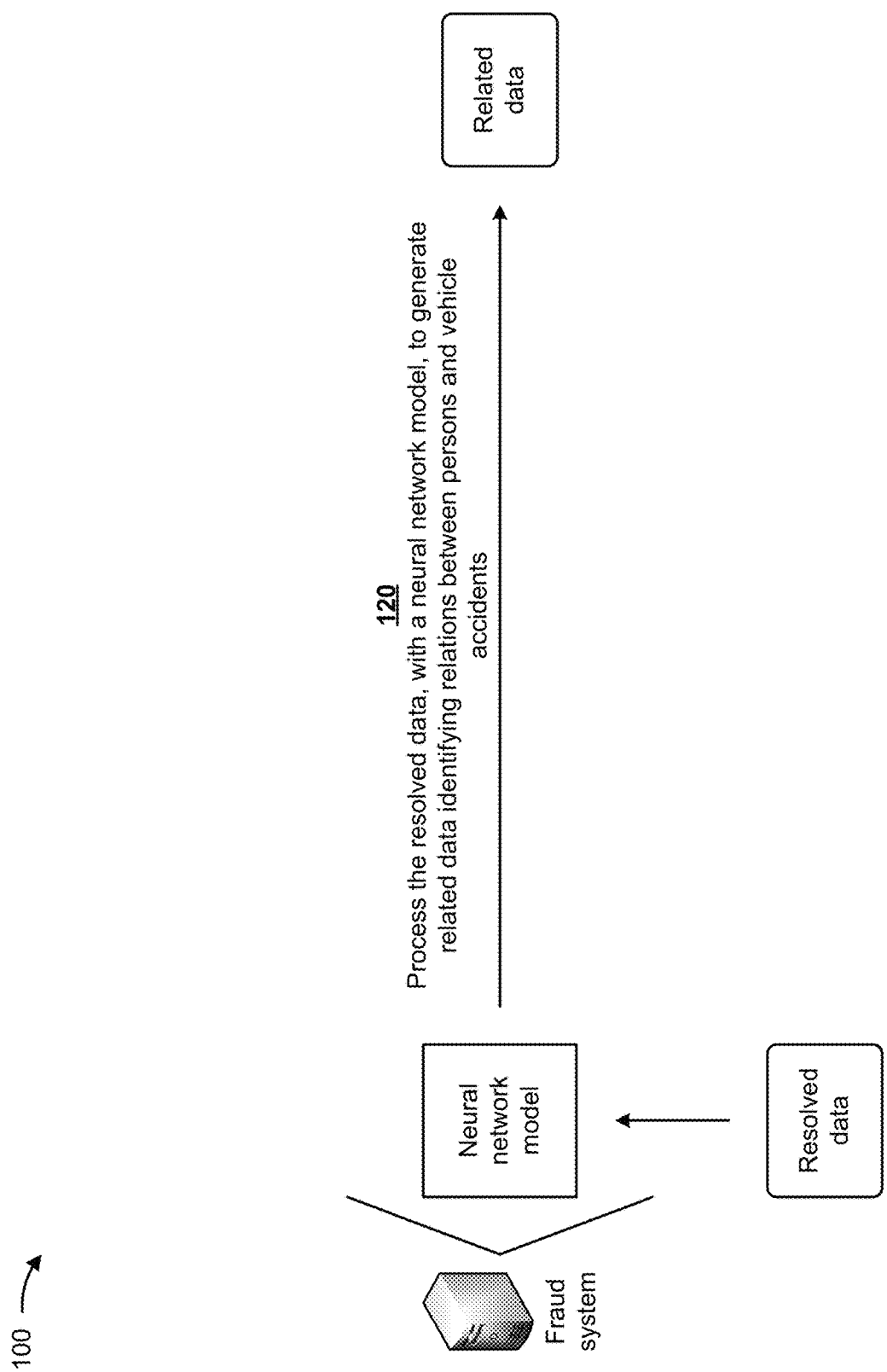

As shown in FIG. 1D, and by reference number 120, the fraud system processes the resolved data, with a neural network model, to generate related data identifying relations between entities (e.g., persons and vehicle accidents, as shown in FIG. 1D). In some implementations, the fraud system may train and/or utilize the neural network model to generate the related data in a manner similar to that described below with respect to FIG. 2.

In some implementations, the fraud system generates the related data based on a plurality of matrices generated based on the resolved data. In some implementations, the plurality of matrices includes an incidence matrix. The incidence matrix may represent the relationship between a first class (e.g., persons) and a second class (e.g., vehicle accidents). The incidence matrix may include one row for each element included in the first class (e.g., one row for each entity corresponding to a person). The incident matrix may include one column for each element included in the second class (e.g., one column for each entity corresponding to a vehicle accident). An entry may be defined by the row and the column in which the entry is included. The value of the entry may be a first value (e.g., 0) when the resolved data indicates that the person associated with the row is not associated with the vehicle accident associated with the column. The value of the entry may be a second value (e.g., 1) when the resolved data indicates that the person is associated with the vehicle accident. For example, the resolved data may identify the person as a claimant associated with the vehicle accident.

As an example, the fraud system may determine that the resolved data indicates that a person is associated with a vehicle accident. The person may be represented by a first row of the incidence matrix and the vehicle accident may be represented by a first column of the incidence matrix. The value of the entry included in the first row and the first column of the incidence matrix may be the second value based on the resolved data indicating that the person is associated with the accident.

In some implementations, the plurality of matrices includes an adjacency matrix. For example, the fraud system may generate an adjacency matrix based on the incidence matrix. The adjacency matrix may be a square matrix. Each row of the adjacency matrix may represent a respective entity, of the entities identified in the resolved data. Similarly, each column of the adjacency matrix may represent a respective entity, of the entities identified in the resolved data. The value of an entry may be the first value when the incidence matrix indicates that the entity represented by a row that includes the entry is not associated with the entity represented by the column that includes the entry and when the entity represented by the row that includes the entry is the same as the entity represented by the column that includes the entry. The value of the entry may be the second value when the incidence matrix indicates that the entity represented by the row that includes the entry is associated to the entity represented by the column that includes the entry.

In some implementations, the adjacency matrix may be a weighted adjacency matrix. For example, the value of the entry may be weighted based on a confidence value indicating a likelihood that the entity represented by the row that includes the entry is associated with the entity represented by the column that includes the entry, based on a confidence value indicating likelihood that the entity represented by the row and/or the column that includes the entry is associated with the vehicle accident, and/or the like.

In some implementations, the plurality of matrices includes a degree matrix. The degree matrix may be a diagonal matrix that contains information indicating a number of edges connecting each node. Each row of the degree matrix may represent a respective node, of the plurality of nodes. Similarly, each column of the degree matrix may represent a respective node of the plurality of nodes. A diagonal of the degree matrix may correspond to entries located within a row and a column representing the same node (e.g., an entry in a first row representing a first node and a first column representing the first node, an entry in a second row representing a second node and a second column representing the second node, and the like). The value of the entry may correspond to a quantity of edges connecting the node to other nodes.

In some implementations, the plurality of matrices may include a Laplacian matrix of the graph. The fraud system may generate the Laplacian matrix based on the adjacency matrix and the degree matrix. The fraud system may generate the Laplacian matrix by subtracting the adjacency matrix from the degree matrix. The fraud system may determine a quantity of spanning trees associated with each entity based on the Laplacian matrix. A spanning tree may include a node representing an entity that is connected to one or more other nodes, representing one or more other entities. The fraud system may determine that the entities represented by the one or more other nodes are associated with the entity represented by the node based on the one or more other nodes being included in the spanning tree.

Figure 1E:
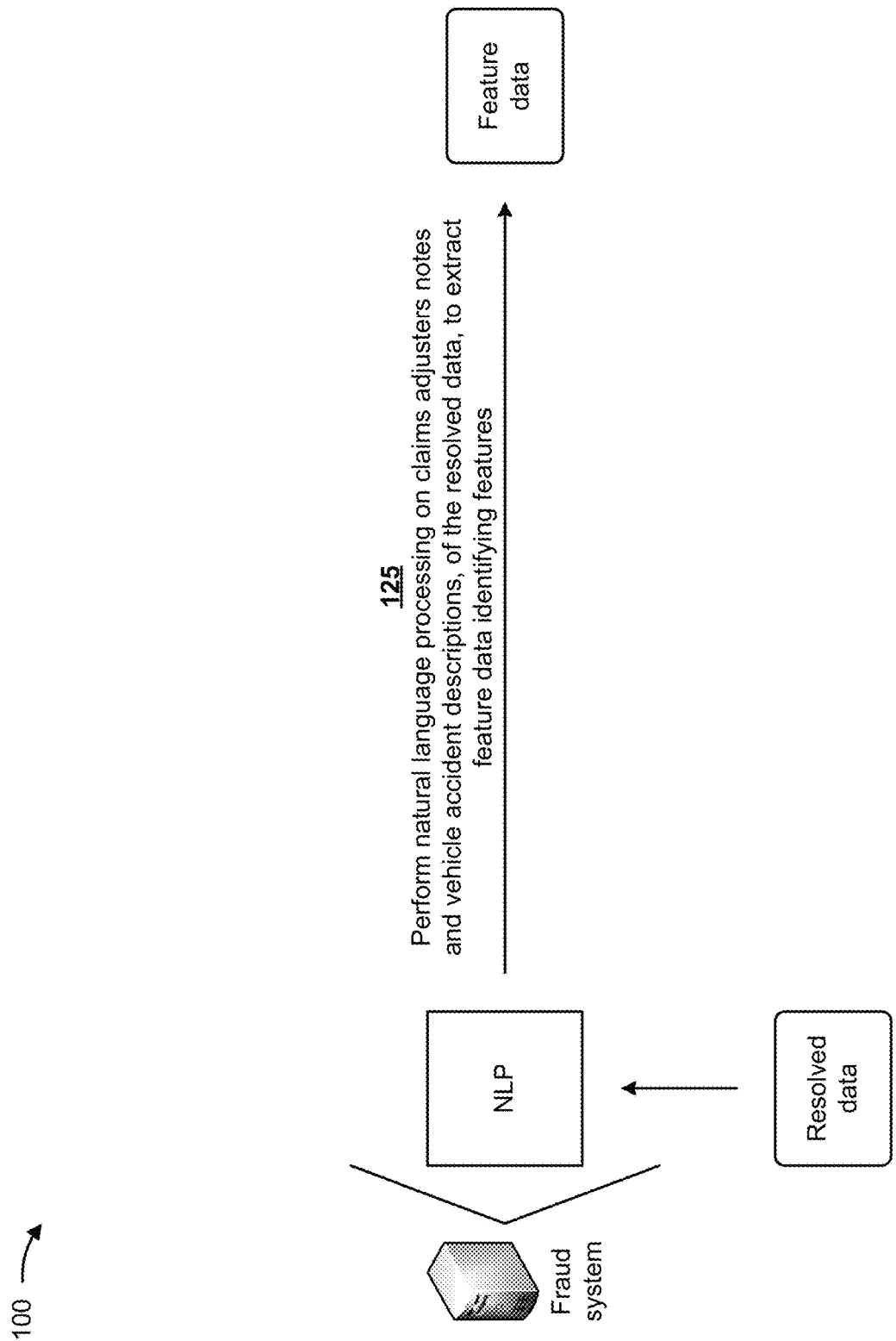

As shown in FIG. 1E, and by reference number 125, the fraud system performs natural language processing (NLP) on claims adjusters notes and vehicle accident descriptions, of the resolved data, to extract feature data identifying features. In some implementations; the fraud system may perform preprocessing based on a natural language processing technique. For example, the fraud system may convert text to lowercase, remove punctuation, remove stop words, strip white space, perform stemming, perform lemmatization, spell out abbreviations and acronyms, and/or the like. In some implementations, the fraud system may remove sparse words, such as words that are uncommon (e.g., according to a domain-specific corpus, and/or the like). Preprocessing for NLP may improve accuracy of NLP and conserve computing resources that would otherwise be used to perform NLP in a less efficient fashion for an unpreprocessed data set.

In some implementations, fraud system may execute a first NLP technique for analyzing unstructured documents. For example, the fraud system may analyze unstructured claims adjusters notes and/or unstructured vehicle accident descriptions using a token-based NLP technique (e.g., a technique using regular expressions), a category-based NLP technique (e.g., a named entity recognition (NER) technique), an approximation-based NLP technique (e.g., a fuzzy text search technique), and/or the like. Additionally, or alternatively, the fraud system may analyze structured log data using a second NLP technique (e.g., a metadata-based NLP technique and/or a similar type of technique).

In some implementations, the fraud system may execute a token-based NLP technique, such as a technique using regular expressions, to identify the features. For example, the fraud system may reference a data structure that stores regular expressions that may be used to identify a feature associated with the vehicle accident (e.g., damaged my car, stopped short, slammed on the brakes, and/or the like). The fraud system may use the regular expressions to identify the feature based on comparing the regular expressions and information included in the claims adjusters notes and/or vehicle accident descriptions.

Additionally, or alternatively, the fraud system may execute an approximation-based NLP technique, such as a fuzzy text search technique, to identify the features. For example, the fraud system may execute an approximation-based NLP technique to identify data that satisfies a threshold level of similarity with data stored in a data structure. In this case, the fraud system may set a threshold level of similarity (e.g., a percentage, a number of characters, etc.), and may compare information included in the claims adjusters notes and/or the vehicle accident descriptions to information stored in the data structure. If the fraud system determines that the threshold level of similarity is satisfied, the fraud system may identify the information as information identifying the feature.

In some implementations, the fraud system may use multiple NLP techniques, and may filter outputs of the multiple NLP techniques into the set of values identifying the features. For example, the fraud system may identify a first set of values using a first one or more NLP techniques. Additionally, the fraud system may identify a second set of values using a second one or more NLP techniques. In some implementations, a mixture of overlapping values and conflicting values may occur. In these implementations, the fraud system may address the conflicting values by filtering the first set of values and the second set of values into a third set of values that excludes duplicate values, excludes conflicting values (e.g., by selecting one value, of two conflicting values, using a rule, such a threshold) and/or the like. The fraud system may use the third set of values as the set of values identifying the features.

In some implementations, the fraud system may execute one or more of the above-mentioned NLP techniques on a particular type of claims adjusters notes, on a particular type of vehicle accident description, on claim adjusters notes and/or vehicle accident descriptions received from a particular server device, on a particular field or group of fields within the claim adjusters notes and/or the vehicle accident descriptions, and/or the like. Additionally, or alternatively, the fraud system may take an average, or a weighted average, of the outputs of the one or more NLP techniques being deployed to identify the features. As an example, the fraud system may assign a weight to an output associated with each additional NLP technique and may take an average or a weighted average to identify the features.

Figure 1F:
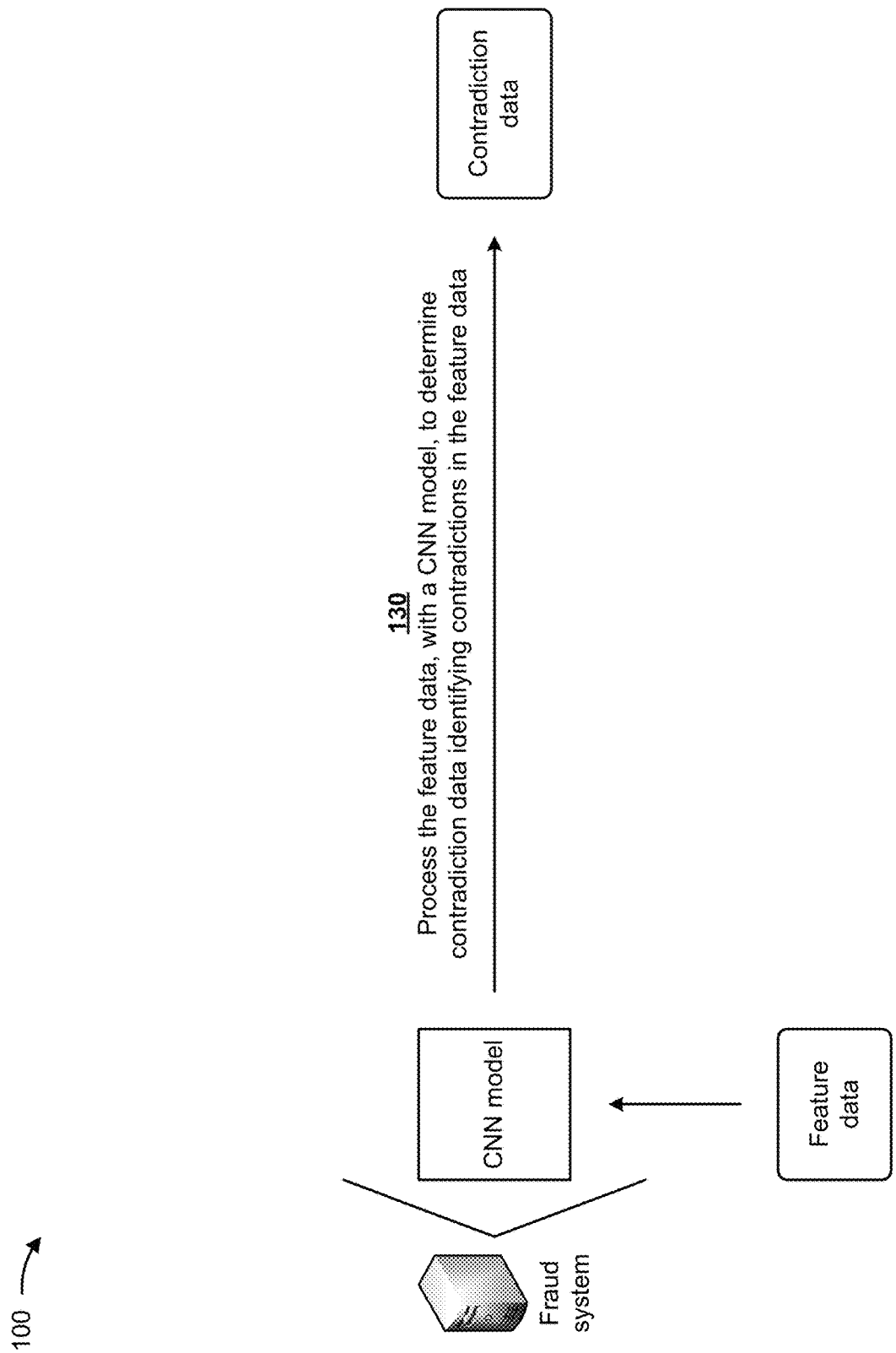

As shown in FIG. 1F, and by reference number 130, the fraud system processes the feature data, with a convolutional neural network (CNN) model, to determine contradiction data identifying contradictions in the feature data. The fraud system may utilize the CNN model to identify features associated with the claims adjusters notes that contradict features associated with the vehicle accident descriptions. In some implementations, the fraud system may utilize and/or train the CNN model in a manner similar to that described below with respect to FIG. 2.

In some implementations, the fraud system utilize a natural language took kit (NLTK) to determine the contradiction data. NLTK may be a NLP technique that utilizes a set of natural language algorithms, such as a tokenizing algorithm, a part-of-speech tagging algorithm, a stemming algorithm, a sentiment analysis algorithm, a topic segmentation algorithm, a named entity recognition algorithm, and/or the like to analyze natural language included in a document. The fraud system may utilize the NLTK to identify features associated with the claims adjusters (e.g., a statement indicating that is was sunny when the vehicle accident occurred) notes that contradict features associated with the vehicle accident descriptions (e.g., a statement indicating that it was raining when the vehicle accident occurred).

Figure 1G:
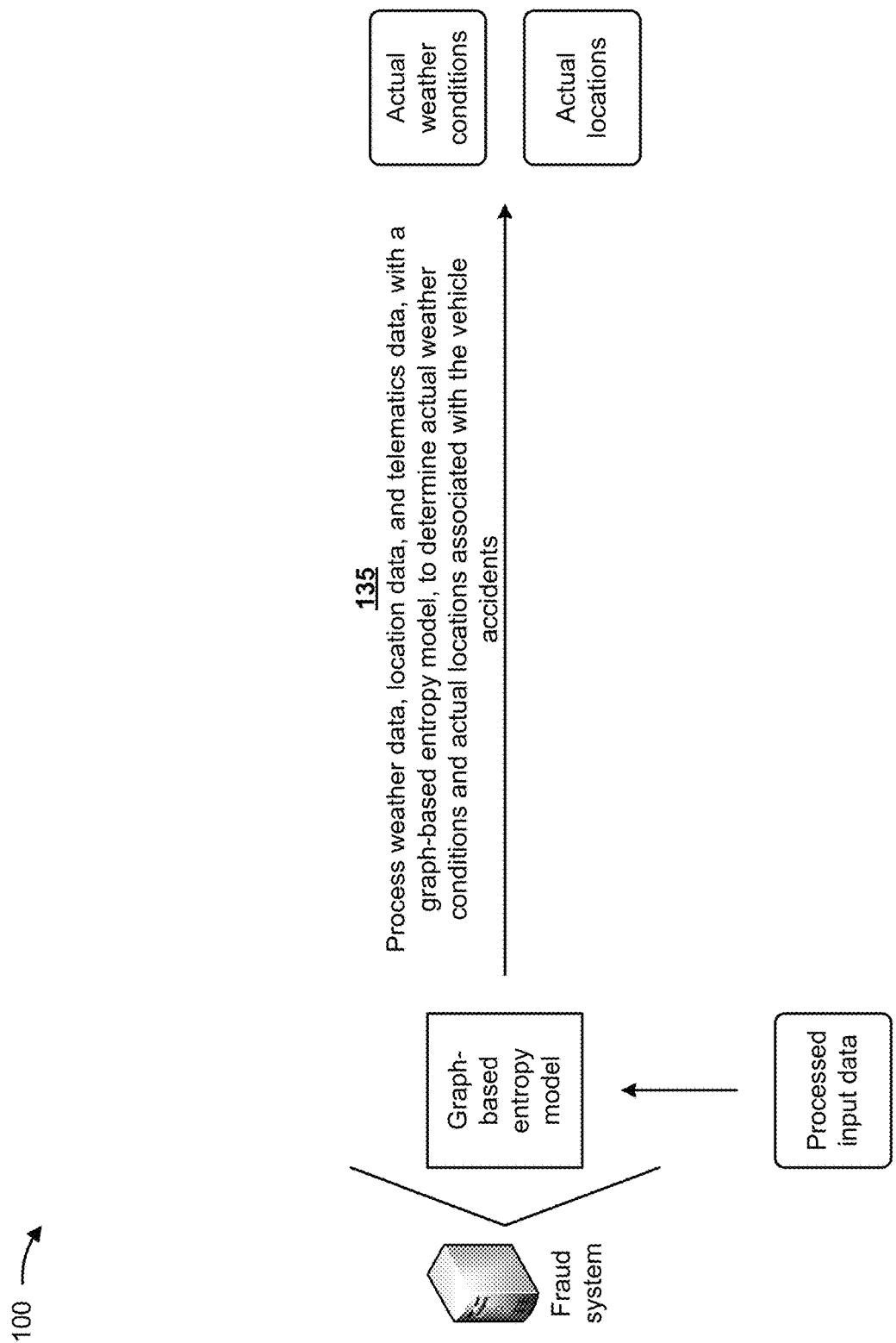

As shown in FIG. 1G, and by reference number 135, the fraud system processes weather data, location data, and telematics data, with a graph-based entropy model, to determine weather conditions and actual locations associated with the vehicle accidents. In some implementations, the fraud system trains and/or utilizes the graph-based entropy model in a manner similar to that described below with respect to FIG. 2.

The fraud system may determine a date, a time, and/or a location associated with a vehicle accident based on the input data (e.g., claims data associated with the vehicle accident, telematics data associated with the vehicle accident, and/or the like). The fraud system may determine actual weather conditions associated with the date, the time, and/or the location based on weather data included in the input data.

The fraud system may determine an actual location associated with the vehicle accident based on telematics data associated with the date and/or the time included in the input data. Alternatively, and/or additionally, the fraud system may determine the actual location based on a rapid automatic keyword extraction (RAKE) algorithm. The fraud system may utilize the RAKE algorithm to analyze the input data to identify words and/or phrases relating to the actual location of the vehicle accident, such as turning loop, bump, traffic signal, intersection, and/or the like. The fraud system may determine the actual location of the vehicle accident based on the identified words and/or phrases. The fraud system may associate information identifying the actual weather conditions and/or information identifying the actual location with the vehicle accident, entities associated with the vehicle accident, the vehicle insurance claim associated with the vehicle accident, and/or the like.

In some implementations, the fraud system generates a co-occurrence matrix to determine a frequency of vehicle accidents occurring at a particular location (e.g., a particular intersection, a particular neighborhood, and/or the like), occurring at a particular type of location (e.g., a sharp curve, on a hill, a location with limited line of sight in a particular direction, and/or the like), occurring during a particular weather condition (e.g., occurring when it is raining, snowing, overcast, and/or the like), occurring at a particular time of day (e.g., 1:00 pm, rush hour, sunset, sunrise, and/or the like), and/or the like. The co-occurrence matrix may include information identifying a respective quantity of times an entity (e.g., a person) is associated with a vehicle accident occurring at a particular location, a particular type of location, during a particular weather condition, at a particular time of day, and/or the like based on associating the information identifying the actual weather conditions and/or the information identifying the actual locations with the vehicle accident, entities associated with the vehicle accident, the vehicle insurance claim associated with the vehicle accident, and/or the like.

As shown in FIG. 1H, and by reference number 140, the fraud system processes the related data, the contradiction data, and data identifying the actual weather conditions and the actual locations associated with the vehicle accidents, with a graph CNN model and a graph-based attention network model, to generate a knowledge graph. In some implementations, the fraud system trains and/or utilizes the graph CNN model and/or the graph-based attention network model in a manner similar to that described below with respect to FIG. 2.

The knowledge graph may integrate the related data, the contradiction data, the data identifying the actual weather conditions, and the data identifying the actual locations associated with the vehicle accidents into an ontology. The ontology may include a category and/or a set of entities associated with one or more vehicle insurance claims and may indicate properties and/or relationships between the entities.

As an example, the knowledge graph may include an ontology associated with a particular person. The ontology may include information identifying one or more vehicle insurance claims associated with the particular person, information identifying a respective role (e.g., claimant, insured, witness, medical provider, claims adjuster, and/or the like) associated with the particular person for each of the one or more vehicle insurance claims, information identifying another person associated with the one or more vehicle insurance claims, information identifying a respective role associated with the other person for each of the one or more vehicle insurance claims, information identifying a respective location associated with each of the one or more vehicle insurance claims, information identifying a respective type of location associated with each of the one or more vehicle insurance claims, and/or the like.

As another example, the knowledge graph may include an ontology associated with a type of location. The ontology may include information identifying one or more vehicle insurance claims associated with the type of location, information identifying a respective group of people associated with the one or more vehicle insurance claims, and/or the like.

Figure 1I:
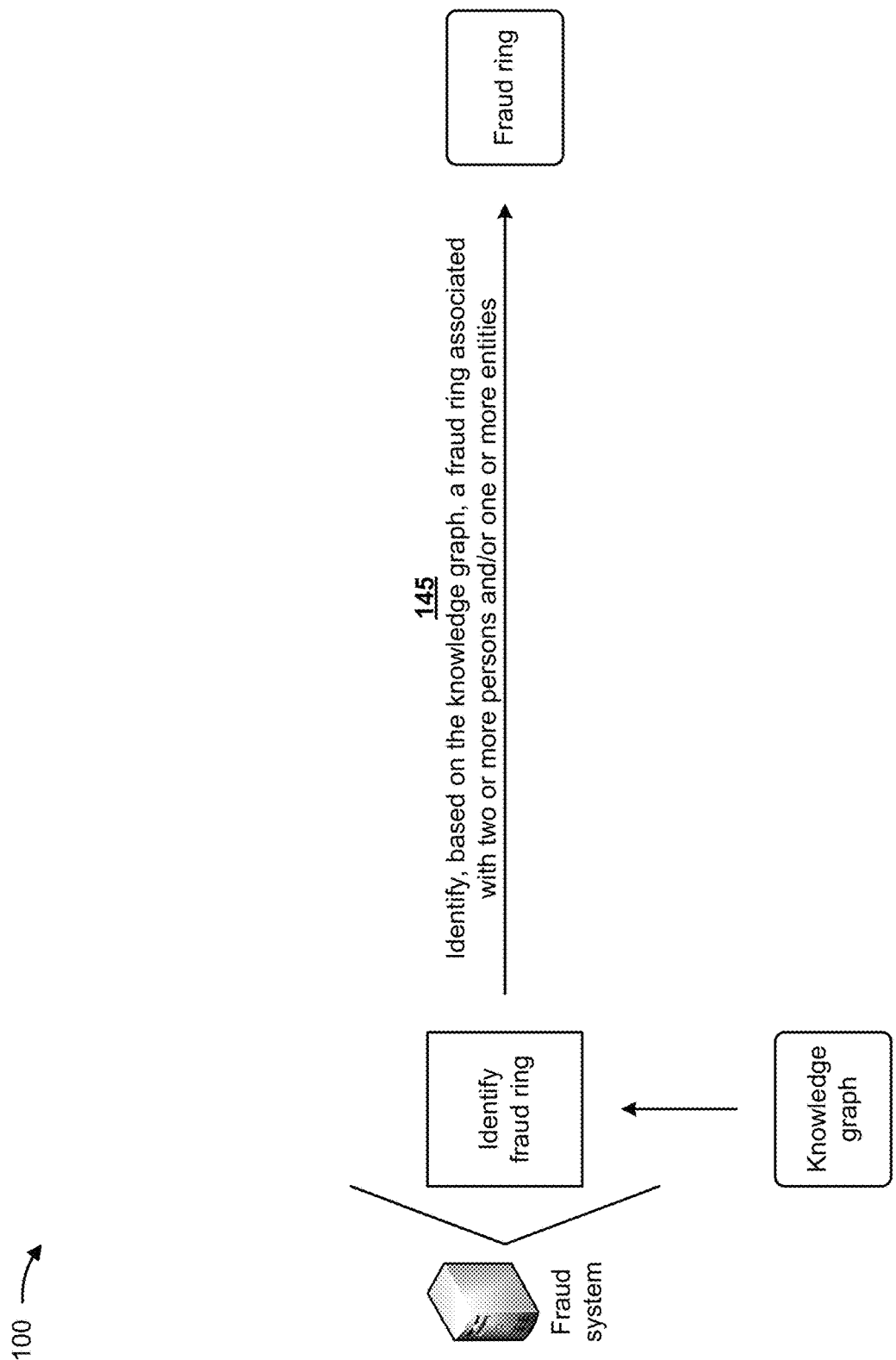

As shown in FIG. 1I, and by reference number 145, the fraud system identifies, based on the knowledge graph, a fraud ring associated with two or more persons and/or one or more entities. The fraud system may analyze the knowledge graph to determine a fraudulent pattern. For example, the fraud system may determine that the knowledge graph includes information indicating that a group of people are associated with a set of vehicle insurance claims based on the knowledge graph, that a common medical provider is associated with the set of vehicle insurance claims, that a common repair shop is associated with the set of vehicle insurance claims, that the social media data indicates suspicious activity, that the group of people reported inaccurate weather conditions for each of the set of vehicle insurance claims, that accidents associated with the set of vehicle insurances claims occurred at the same location and/or the same type of location, and/or the like.

Figure 1J:
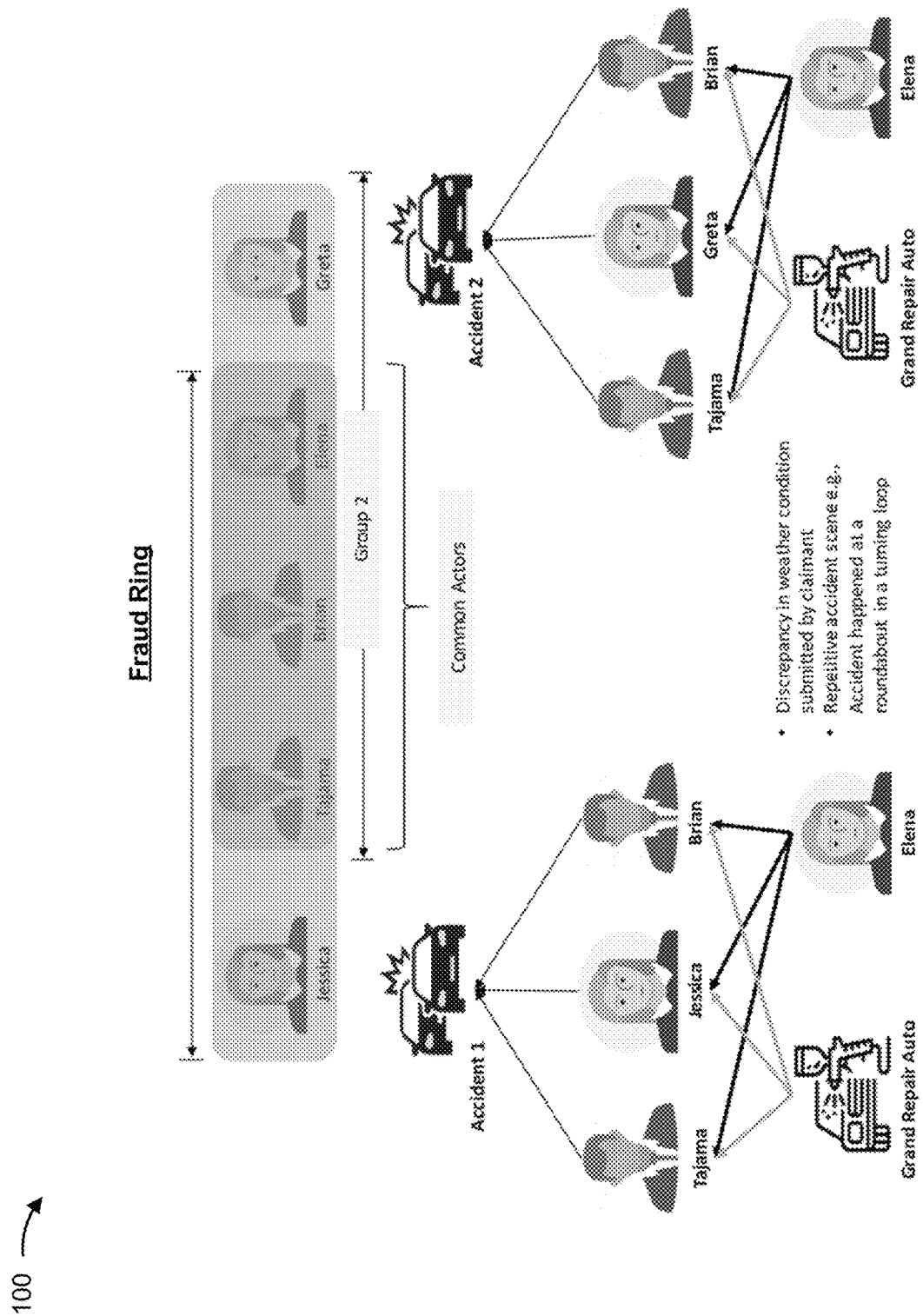

FIG. 1J is a diagram illustrating a knowledge graph that includes information indicating fraudulent patterns used to identify a fraud ring. As shown in FIG. 1J, the knowledge graph includes information identifying a group of people (e.g., Tajama, Brian, and Elena, as shown in FIG. 1J) associated with a set of vehicle accidents (e.g., Accident 1 and Accident 2, as shown in FIG. 1J). As further shown in FIG. 1J, the knowledge graph includes information indicating that a same repair shop is associated with the set of vehicle accidents (e.g., Grand Repair Auto, as shown in FIG. 1J), that the group of people reported inaccurate weather conditions for each vehicle accident, and that the vehicle accidents occurred at the same type of location (e.g., a turning loop, as shown in FIG. 1J).

As shown in FIG. 1K, and by reference number 150, the fraud system performs one or more actions based on the fraud ring. In some implementations, the one or more actions include utilizing convolutional autoencoders to validate the identification of the fraud ring. The convolutional autoencoder may process an image associated with a vehicle accident to reduce noise included in the image. For example, the telematics data may include an image captured by a dashcam. The image may depict a person identified as being part of a fraud ring at a location of a vehicle accident. The fraud system may utilize the convolutional autoencoder process the image to reduce noise included in the image. The fraud system may utilize the processed image to validate the identity of the person. For example, the fraud system may compare the processed image to another image of the person and may validate the identity of the person based on the comparison. In this way, the fraud system may enable the identity of persons included in a fraud ring to be quickly and efficiently validated thereby conserving computing resources relative to performing a manual process (e.g., utilizing an investigator, manually comparing images of the person, and/or the like) to validate the identity of persons in the fraud ring.

In some implementations, the one or more actions include notifying one or more insurance companies associated with a claimant of an insurance claim about the fraud ring and/or causing insurance claims associated with the fraud ring to be denied. The fraud system may provide information identifying the fraud ring, information identifying one or more fraudulent insurance claims associated with the fraud ring, and/or the like to an insurance company (e.g., a client device and/or a server device associated with the insurance company) associated with the fraudulent insurance claims. The insurance company may receive the information from the fraud system and may deny the one or more fraudulent insurance claims based on the information.

In some implementations, the one or more actions include notifying one or more law enforcement agencies about the fraud ring. The fraud system may provide information identifying the people included in the fraud ring, information identifying a fraudulent pattern associated with the fraud ring, and/or the like to one or more law enforcement agencies. In this way, the fraud ring may be prevented from submitting additional fraudulent claims thereby conserving computing resources that otherwise may have been utilized to process the fraudulent claims.

In some implementations, the one or more actions include causing vehicles associated with the two or more persons of the fraud ring to be disabled. For example, the fraud system may send information to autonomous driving systems of the vehicles associated with the two or more persons of the fraud ring to cause the autonomous driving systems to disable the vehicles. In this way, the fraud system may automatically prevent the two or more persons from utilizing the vehicles in an attempt to cause another accident for which the two or more persons may file a fraudulent vehicle insurance claim.

In some implementations, the one or more actions include retraining one or more of the models based on data associated with the fraud ring. The fraud system may include information included in the knowledge graph in training data used to train one or more of the models utilized by the fraud system. In this way, an amount of training data utilized to train the one or more models may be increased. By increasing the amount of training data, an accuracy associated with the one or more models may be increased thereby increasing an accuracy associated with the fraud system identifying the fraud ring. Increasing the accuracy associated with the fraud system identifying the fraud ring may increase a quantity of fraud rings identified by the fraud system and/or may reduce a quantity of fraudulent vehicle insurance claims processed by an insurance company. The reduction in the quantity of fraudulent vehicle insurance claims processed by the insurance company may conserve computing resources that would otherwise have been utilized to process the fraudulent vehicle insurance claims.

As indicated above, FIGS. 1A-1K are provided as an example. Other examples may differ from what is described with regard to FIGS. 1A-1K. The number and arrangement of devices shown in FIGS. 1A-1K are provided as an example. In practice, there may be additional devices, fewer devices, different devices, or differently arranged devices than those shown in FIGS. 1A-1K. Furthermore, two or more devices shown in FIGS. 1A-1K may be implemented within a single device, or a single device shown in FIGS. 1A-1K may be implemented as multiple, distributed devices. Additionally, or alternatively, a set of devices (e.g., one or more devices) shown in FIGS. 1A-1K may perform one or more functions described as being performed by another set of devices shown in FIGS. 1A-1K.

Figure 2:
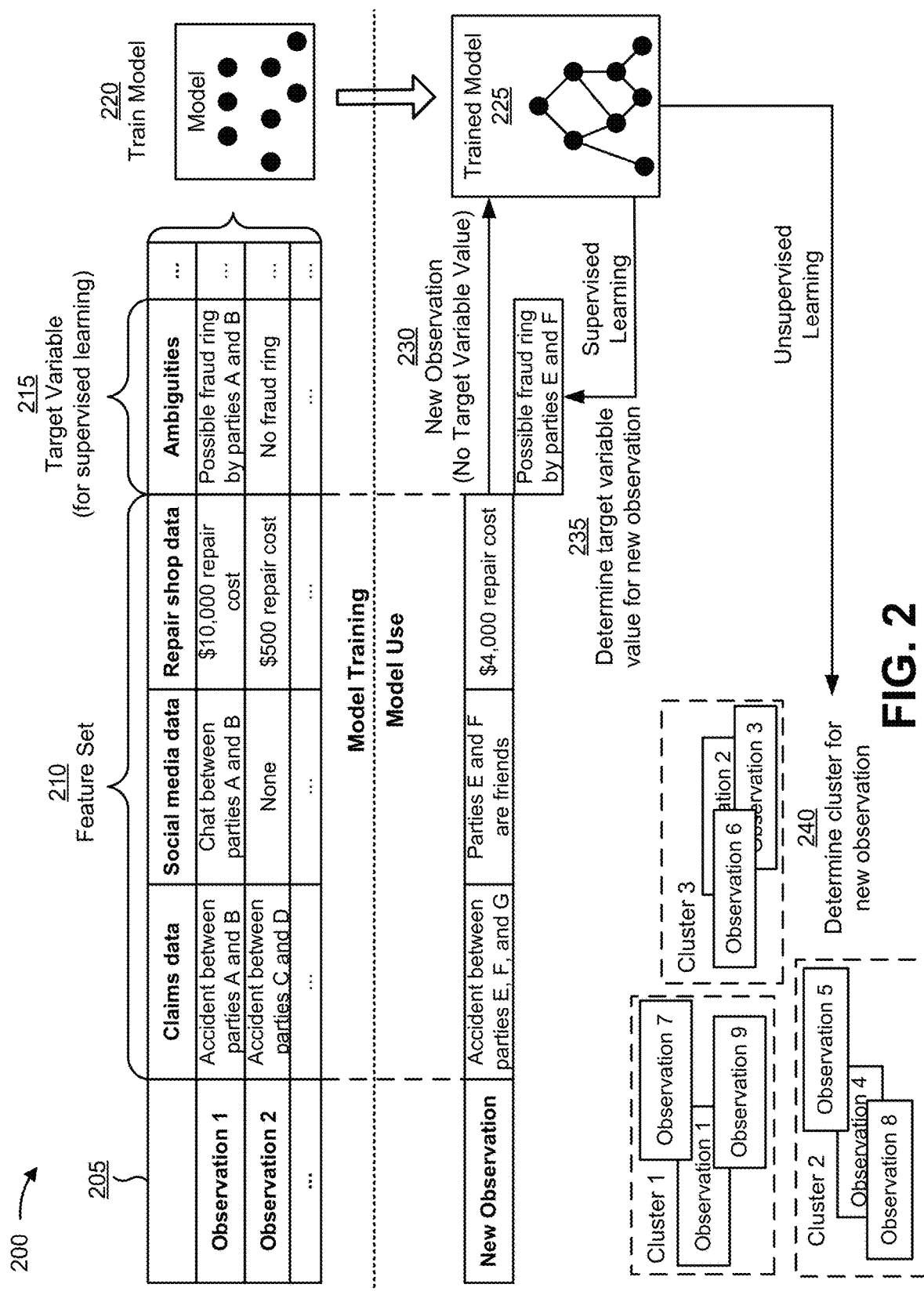
FIG. 2 is a diagram illustrating an example 200 of training and using a machine learning model in connection with utilizing predictive analytics and data mining to identify a vehicle insurance fraud ring.

FIG. 2 is a diagram illustrating an example 200 of training and using a machine learning model in connection with utilizing predictive analytics and data mining to identify a vehicle insurance fraud ring. The machine learning model training and usage described herein may be performed using a machine learning system. The machine learning system may include or may be included in a computing device, a server, a cloud computing environment, and/or the like, such as the fraud system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the fraud system, the client device, and/or the server device, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the fraud system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of claims data, a second feature of social media data, a third feature of repair shop data, and so on. As shown, for a first observation, the first feature may have a value of accident between parties A and B, the second feature may have a value of chat between parties A and B, the third feature may have a value of $10,000 repair cost, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, labels, and/or the like), may represent a variable having a Boolean value, and/or the like. A target variable may be associated with a target variable value, and a target variable value may be specific to an observation. In example 200, the target variable is ambiguities, which has a value of possible fraud ring by parties A and B for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of accident between parties E, F, and G, a second feature of parties E and F are friends, a third feature of $4,000 repair cost, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of possible fraud ring by parties E and F for the target variable of ambiguities for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like. The first recommendation may include, for example, a recommendation to further investigate the possible fraud ring, provide a notification indicating a possible fraud ring, and/or the like. The first automated action may include, for example, automatically assign an investigator to perform an investigation to determine whether a fraud ring exists.

As another example, if the machine learning system were to predict a value of no fraud ring for the target variable of ambiguities, then the machine learning system may provide a second (e.g., different) recommendation (e.g., a recommendation to setting an insurance claim) and/or may perform or cause performance of a second (e.g., different) automated action (e.g., automatically setting an insurance claim).

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a possible fraud ring cluster), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a no fraud ring cluster), then the machine learning system may provide a second (e.g., different) recommendation (e.g., a recommendation to settle an insurance claim) and/or may perform or cause performance of a second (e.g., different) automated action, such as automatically settling an insurance claim.

In some implementations, the recommendation and/or the automated action associated with the new observation may be based on a target variable value having a particular label (e.g., classification, categorization, and/or the like), may be based on whether a target variable value satisfies one or more threshold (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to identifying fraud rings. The machine learning system enables recognition and/or identification of tens, hundreds, thousands, or millions of features and/or feature values for tens, hundreds, thousands, or millions of observations, thereby increasing accuracy and consistency and reducing delay associated with identifying fraud rings relative to requiring computing resources to be allocated for tens, hundreds, or thousands of operators to manually identifying fraud rings using the features or feature values.

As indicated above, FIG. 2 is provided as an example. Other examples may differ from what is described in connection with FIG. 2.

Figure 3:
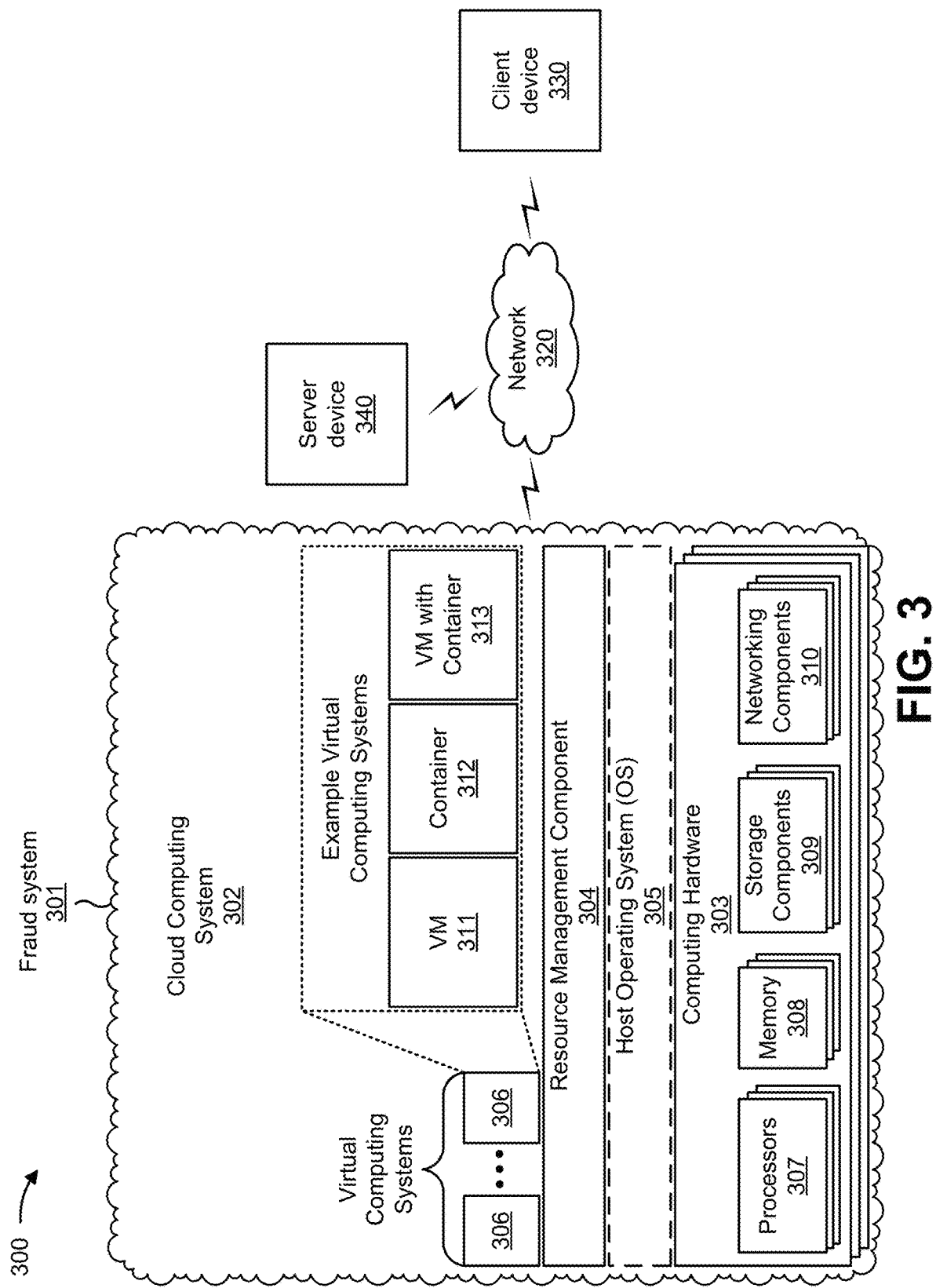
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a fraud system 301, which may include one or more elements of and/or may execute within a cloud computing system 302. The cloud computing system 302 may include one or more elements 303-313, as described in more detail below. As further shown in FIG. 3, environment 300 may include a network 320, a client device 330, and/or a server device 340. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the fraud system 301 may include one or more elements 303-313 of the cloud computing system 302, may execute within the cloud computing system 302, and/or may be hosted within the cloud computing system 302, in some implementations, the fraud system 301 may not be cloud-based (e.g., may be implemented outside of a cloud computing system) or may be partially cloud-based. For example, the fraud system 301 may include one or more devices that are not part of the cloud computing system 302, such as device 400 of FIG. 4, which may include a stand-alone server or another type of computing device. The fraud system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

Client device 330 includes one or more devices capable of receiving, generating, storing, processing, and/or providing information associated with identifying a fraud ring, as described elsewhere herein. Client device 330 may include a communication device and/or a computing device. For example, client device 330 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. Client device 330 may communicate with one or more other devices of environment 300, as described elsewhere herein.

Server device 340 includes one or more devices capable of receiving, generating, storing, processing, providing, and/or routing information associated with identifying a fraud ring, as described elsewhere herein. Server device 340 may include a communication device and/or a computing device. For example, the server device 340 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. Server device 340 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
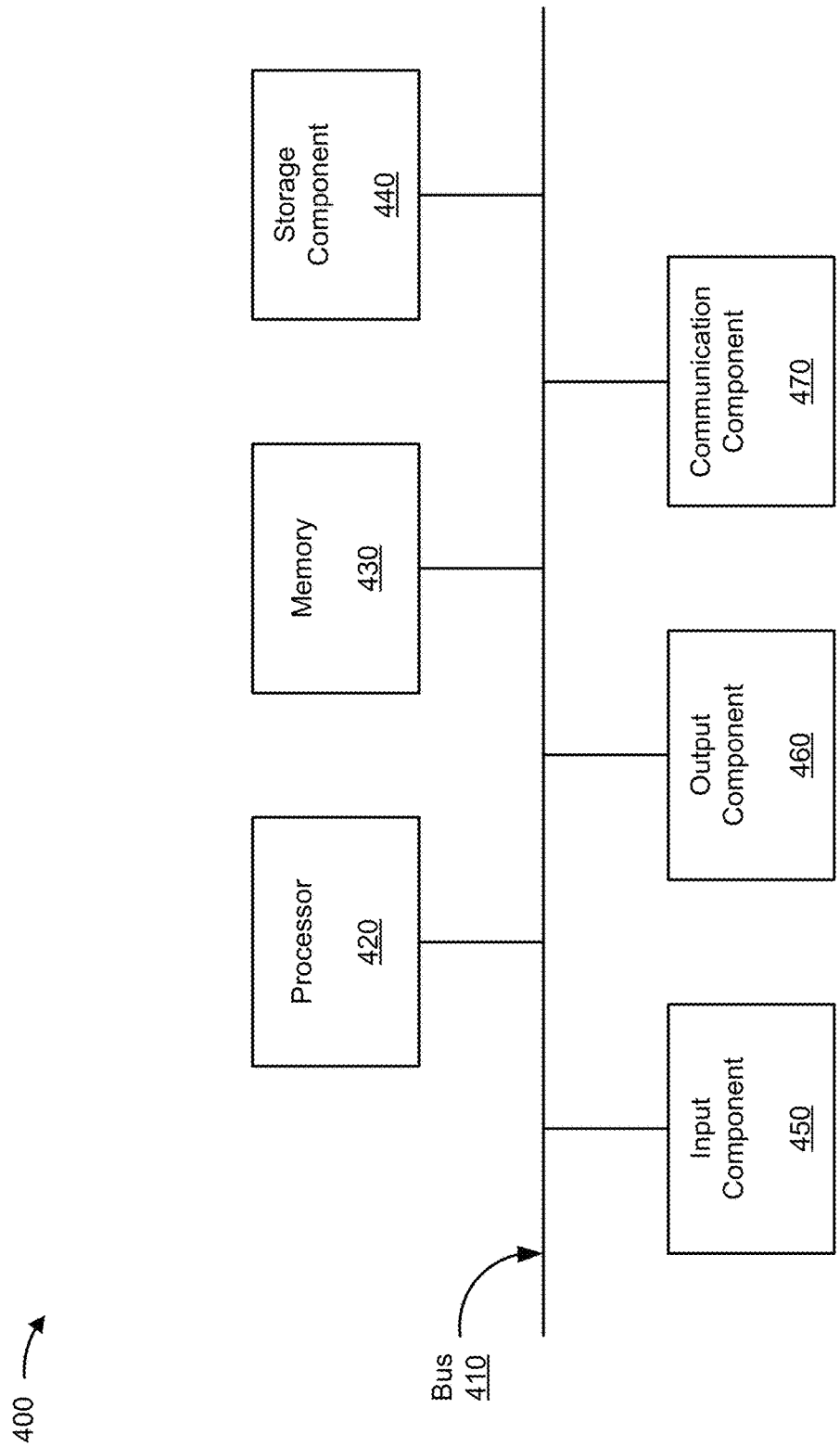
FIG. 4 is a diagram of example components of one or more devices of FIG. 3.

FIG. 4 is a diagram of example components of a device 400, which may correspond to fraud system 301, client device 330, and/or server device 340. In some implementations, fraud system 301, client device 330, and/or server device 340 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
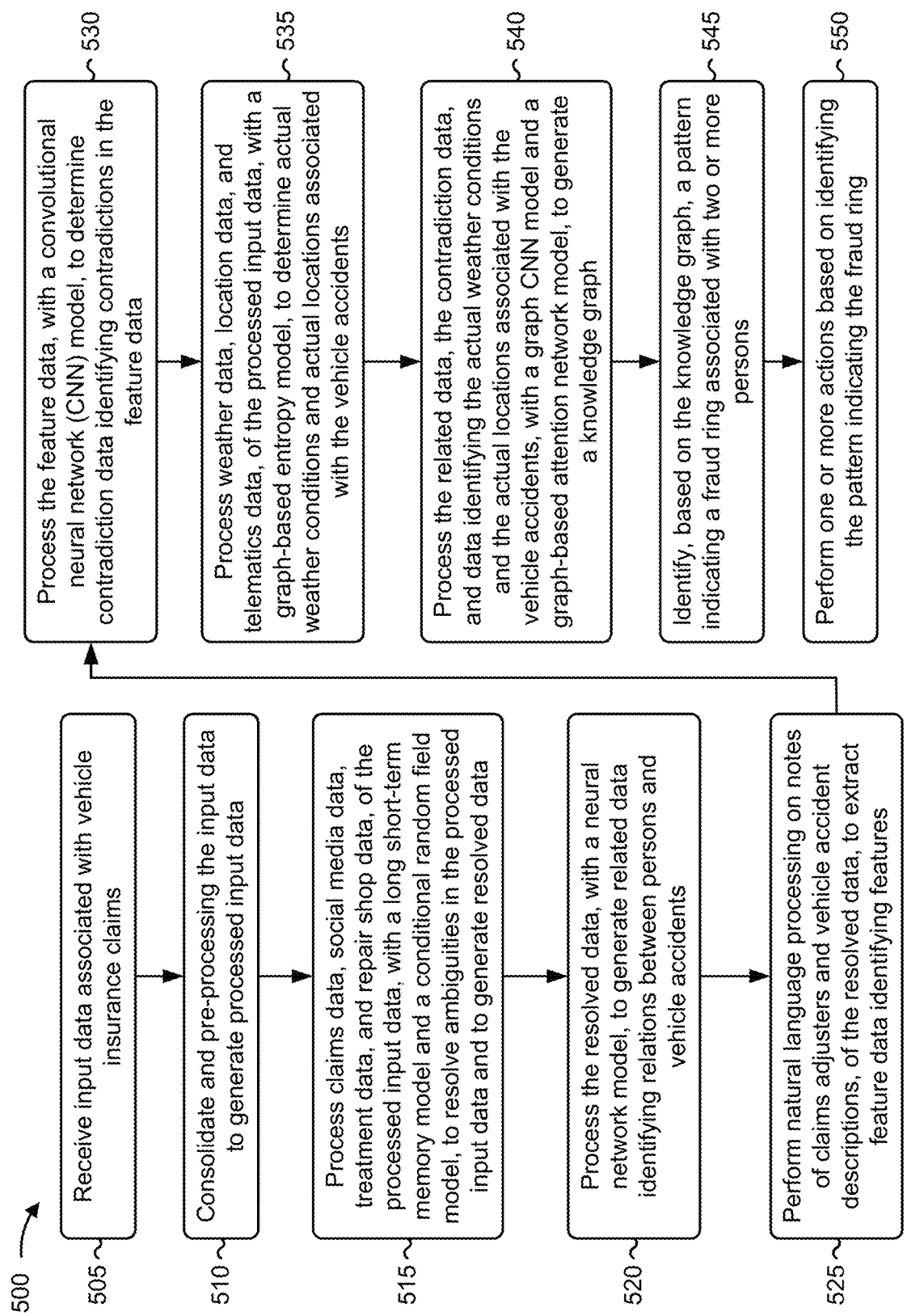
FIG. 5 is a flow chart of example processes relating to utilizing machine learning models, predictive analytics, and data mining to identify a vehicle insurance fraud ring.

FIG. 5 is a flowchart of an example process 500 associated with utilizing machine learning models, predictive analytics, and data mining to identify a vehicle insurance fraud ring. In some implementations, one or more process blocks of FIG. 5 may be performed by a device (e.g., fraud system 301). In some implementations, one or more process blocks of FIG. 5 may be performed by another device or a group of devices separate from or including the device, such as a client device (e.g., client device 330), a server device (e.g., server device 340), and/or the like. Additionally, or alternatively, one or more process blocks of FIG. 5 may be performed by one or more components of a device 400, such as processor 420, memory 430, storage component 440, input component 450, output component 460, communication component 470, and/or the like.

As shown in FIG. 5, process 500 may include receiving input data associated with vehicle insurance claims (block 505). For example, the device may receive input data associated with vehicle insurance claims, as described above. In some implementations, the input data includes one or more of: the claims data identifying the vehicle insurance claims for the vehicle accidents, the social media data identifying social media interactions of parties associated with the vehicle accidents, the treatment data identifying treatment of the vehicle insurance claims, the repair shop data identifying repair shop costs associated with the vehicle insurance claims, the data identifying the actual weather conditions and the actual locations associated with the vehicle accidents, the weather data identifying weather associated with the vehicle accidents, the location data identifying geographical locations associated with the vehicle accidents, or the telematics data identifying telematics associated with the vehicle accidents.

As further shown in FIG. 5, process 500 may include consolidating and pre-processing the input data to generate processed input data (block 510). For example, the device may consolidate and pre-processing the input data to generate processed input data, as described above.

As further shown in FIG. 5, process 500 may include processing claims data, social media data, treatment data, and repair shop data, of the processed input data, with a long short-term memory model and a conditional random field model, to resolve ambiguities in the processed input data and to generate resolved data (block 515). For example, the device may process claims data, social media data, treatment data, and repair shop data, of the processed input data, with a long short-term memory model and a conditional random field model, to resolve ambiguities in the processed input data and to generate resolved data, as described above. In some implementations, processing the claims data, the social media data, the treatment data, and the repair shop data, of the processed input data, with the long short-term memory model and the conditional random field model, to resolve the ambiguities in the processed input data and to generate the resolved data comprises: processing the claims data, the social media data, the treatment data, and the repair shop data, of the processed input data, with the long short-term memory model and the conditional random field model, to identify persons involved in vehicle insurance claims, and processing data identifying the persons involved in the vehicle insurance claims, with a Levenshtein distance model and a bidirectional long short-term memory model, to resolve the ambiguities in the processed input data and to generate the resolved data.

As further shown in FIG. 5, process 500 may include processing the resolved data, with a neural network model, to generate related data identifying relations between persons and vehicle accidents (block 520). For example, the device may process the resolved data, with a neural network model, to generate related data identifying relations between persons and vehicle accidents, as described above. The neural network model may include a graph neural network model based on an incidence matrix, an adjacency matrix, a degree matrix, and a Laplacian matrix.

As further shown in FIG. 5, process 500 may include performing natural language processing on notes of claims adjusters and vehicle accident descriptions, of the resolved data, to extract feature data identifying features (block 525). For example, the device may perform natural language processing on notes of claims adjusters and vehicle accident descriptions, of the resolved data, to extract feature data identifying features, as described above. The feature data may include one or more of nouns connected to a query context, verbs connected to the query context, adverbs connected to the query context, adjectives connected to the query context, or phrases connected to the query context. In some implementations, the device may perform natural language processing on the social media data to extract additional features for the feature data.

As further shown in FIG. 5, process 500 may include processing the feature data, with a convolutional neural network (CNN) model, to determine contradiction data identifying contradictions in the feature data (block 530). For example, the device may process the feature data, with a convolutional neural network (CNN) model, to determine contradiction data identifying contradictions in the feature data, as described above. When processing the feature data, the device may process the feature data associated with the notes of the claims adjusters, with the CNN model, to determine first meanings associated with the notes of the claims adjuster, process the feature data associated with the vehicle accident descriptions, with the CNN model, to determine second meanings associated with the vehicle accident descriptions, and compare the first meanings and the second meanings to determine the contradiction data identifying the contradictions in the feature data.

As further shown in FIG. 5, process 500 may include processing weather data, location data, and telematics data, of the processed input data, with a graph-based entropy model, to determine actual weather conditions and actual locations associated with the vehicle accidents (block 535). For example, the device may process weather data, location data, and telematics data, of the processed input data, with a graph-based entropy model, to determine actual weather conditions and actual locations associated with the vehicle accidents, as described above. The telematics data may include data identifying one or more of vehicle accelerations exceeding an acceleration threshold, vehicle braking conditions exceeding a braking threshold, or vehicle cornering conditions exceeding a cornering threshold. When processing the weather data, the location data, and the telematics data, the device may process the weather data, the location data, and the telematics data, with the graph-based entropy model, to generate a co-occurrence matrix; determine the actual weather conditions and the actual locations associated with the vehicle accidents based on the co-occurrence matrix; and determine frequencies of the vehicle accidents based on the actual weather conditions and the actual locations. In some implementations, the device may perform data mining on the weather data to identify weather associated with the vehicle accidents. The device may perform data mining on the location data to identify geographical locations associated with the vehicle accidents. The device may perform data mining on the telematics data to identify telematics associated with the vehicle accidents.

As further shown in FIG. 5, process 500 may include processing the related data, the contradiction data, and data identifying the actual weather conditions and the actual locations associated with the vehicle accidents, with a graph CNN model and a graph-based attention network model, to generate a knowledge graph (block 540). For example, the device may process the related data, the contradiction data, and data identifying the actual weather conditions and the actual locations associated with the vehicle accidents, with a graph CNN model and a graph-based attention network model, to generate a knowledge graph, as described above.

As further shown in FIG. 5, process 500 may include identifying, based on the knowledge graph, a pattern indicating a fraud ring associated with two or more persons (block 545). For example, the device may identify, based on the knowledge graph, a pattern indicating a fraud ring associated with two or more persons, as described above.

As further shown in FIG. 5, process 500 may include performing one or more actions based on identifying the pattern indicating the fraud ring (block 550). For example, the device may perform one or more actions based on identifying the fraud ring, as described above. In some implementations, performing the one or more actions includes one or more of: utilizing one or more convolutional autoencoders to validate the identification of the fraud ring; cause one or more insurance claims associated with the fraud ring to be denied; or notifying one or more law enforcement agencies about the fraud ring. In some implementations, performing the one or more actions includes one or more of: notifying one or more vehicle insurance companies about the fraud ring; causing one or more vehicles associated with the two or more persons of the fraud ring to be disabled; or retraining one or more of the long short-term memory model, the conditional random field model, the neural network model, the CNN model, the graph-based entropy model, the graph CNN model, or the graph-based attention network model based on data associated with the fraud ring. Alternatively, and/or additionally, performing the one or more actions includes one or more of causing one or more insurance claims associated with the fraud ring to be denied; notifying one or more law enforcement agencies about the fraud ring; notifying one or more vehicle insurance companies about the fraud ring; causing one or more vehicles associated with the two or more persons of the fraud ring to be disabled; or retraining one or more of the long short-term memory model, the conditional random field model, the neural network model, the CNN model, the graph-based entropy model, the graph CNN model, or the graph-based attention network model based on the data identifying the fraud ring.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a device, input data associated with vehicle insurance claims;
consolidating and pre-processing, by the device, the input data to generate processed input data;
processing, by the device, claims data, social media data, treatment data, and repair shop data, of the processed input data, with a long short-term memory model and a conditional random field model, to resolve ambiguities in the processed input data and to generate resolved data,
wherein processing the claims data, the social media data, the treatment data, and the repair shop data comprises:

predicting classifications associated with entities identified in the claims data, the social media data, the treatment data, and the repair shop data based on determining a particular word within a threshold quantity of words, generating a co-resolution matrix based on the entities and the classifications, determining a value for the co-resolution matrix, based on a Levenshtein distance between a first named entity, of the entities, and a second named entity, of the entities, based on a minimum quantity of single character edits required to cause the first named entity and the second named entity to match, determining an ambiguity, of the ambiguities, exists between the first named entity and the second named entity based on the Levenshtein distance, and resolving the ambiguity based on replacing the first named entity or the second named entity with a common identifier;

processing, by the device, the resolved data, with a neural network model, to generate related data identifying relations between persons and vehicle accidents;

performing, by the device, natural language processing on notes of claims adjusters and vehicle accident descriptions, of the resolved data, to extract feature data identifying features;

processing, by the device, the feature data, with a convolutional neural network (CNN) model, to determine contradiction data identifying contradictions in the feature data;

processing, by the device, weather data, location data, and telematics data, of the processed input data, with a graph-based entropy model, to determine actual weather conditions and actual locations associated with the vehicle accidents;

processing, by the device, the related data, the contradiction data, and data identifying the actual weather conditions and the actual locations associated with the vehicle accidents, with a graph CNN model and a graph-based attention network model, to generate a knowledge graph;

identifying, by the device and based on the knowledge graph, a fraud ring associated with two or more persons; and performing, by the device, one or more actions based on identifying the fraud ring.

2. The method of claim 1, wherein performing the one or more actions includes one or more of:

utilizing one or more convolutional autoencoders to validate an identification of the fraud ring;

causing one or more insurance claims associated with the fraud ring to be denied; or notifying one or more law enforcement agencies about the fraud ring.

3. The method of claim 1, wherein performing the one or more actions includes one or more of:

notifying one or more vehicle insurance companies about the fraud ring;

causing one or more vehicles associated with the two or more persons of the fraud ring to be disabled; or retraining one or more of the long short-term memory model, the conditional random field model, the neural network model, the CNN model, the graph-based entropy model, the graph CNN model, or the graph-based attention network model based on data associated with the fraud ring.

4. The method of claim 1, wherein the input data includes one or more of:

the claims data identifying the vehicle insurance claims for the vehicle accidents, the social media data identifying social media interactions of parties associated with the vehicle accidents, the treatment data identifying treatment of the vehicle insurance claims, the repair shop data identifying repair shop costs associated with the vehicle insurance claims, the data identifying the actual weather conditions and the actual locations associated with the vehicle accidents, the weather data identifying weather associated with the vehicle accidents, the location data identifying geographical locations associated with the vehicle accidents, or the telematics data identifying telematics associated with the vehicle accidents.

5. The method of claim 1, further comprising one or more of:

performing data mining on the weather data to identify weather associated with the vehicle accidents;

performing data mining on the location data to identify geographical locations associated with the vehicle accidents; or performing data mining on the telematics data to identify telematics associated with the vehicle accidents.

6. The method of claim 1, wherein processing the claims data, the social media data, the treatment data, and the repair shop data, of the processed input data, with the long short-term memory model and the conditional random field model, to resolve the ambiguities in the processed input data and to generate the resolved data comprises:

processing the claims data, the social media data, the treatment data, and the repair shop data, of the processed input data, with the long short-term memory model and the conditional random field model, to identify persons involved in vehicle insurance claims; and processing data identifying the persons involved in the vehicle insurance claims, with a Levenshtein distance model and a bidirectional long short-term memory model, to resolve the ambiguities in the processed input data and to generate the resolved data.

7. The method of claim 1, wherein the neural network model includes a graph neural network model based on an incidence matrix, an adjacency matrix, a degree matrix, and a Laplacian matrix.

8. A device, comprising:

one or more memories; and one or more processors, communicatively coupled to the one or more memories, configured to:

receive input data associated with vehicle insurance claims;

process claims data, social media data, treatment data, and repair shop data, of the input data, with a first model and a second model, to resolve ambiguities in the input data and to generate resolved data, wherein the one or more processors, to process the claims data, the social media data, the treatment data, and the repair shop data, are configured to:

predict classifications associated with entities identified in the claims data, the social media data, the treatment data, and the repair shop data based on determining a particular word within a threshold quantity of words,
generate a co-resolution matrix based on the entities and the classifications,
determine a value for the co-resolution matrix, based on a Levenshtein distance between a first named entity, of the entities, and a second named entity, of the entities, based on a minimum quantity of single character edits required to cause the first named entity and the second named entity to match,
determine an ambiguity, of the ambiguities, exists between the first named entity and the second named entity based on the Levenshtein distance, and
resolve the ambiguity based on replacing the first named entity or the second named entity with a common identifier;
process the resolved data, with a third model, to generate related data identifying relations between persons and vehicle accidents;
perform natural language processing on notes of claims adjusters and vehicle accident descriptions, of the resolved data, to extract feature data identifying features;
process the feature data, with a fourth model, to determine contradiction data identifying contradictions in the feature data;
process weather data, location data, and telematics data, of the input data, with a fifth model, to determine actual weather conditions and actual locations associated with the vehicle accidents;
process the related data, the contradiction data, and data identifying the actual weather conditions and the actual locations associated with the vehicle accidents, with a sixth model and a seventh model, to generate a knowledge graph;
determine, based on the knowledge graph, a fraud ring associated with two or more persons; and
perform one or more actions based on the fraud ring.

9. The device of claim 8, wherein the one or more processors are further configured to:
perform natural language processing on the social media data to extract additional features for the feature data.

10. The device of claim 8, wherein the feature data includes one or more of:
nouns connected to a query context,
verbs connected to the query context,
adverbs connected to the query context,
adjectives connected to the query context, or
phrases connected to the query context.

11. The device of claim 8, wherein the one or more processors, when processing the feature data, with the fourth model, to determine the contradiction data identifying the contradictions in the feature data, are configured to:
process the feature data associated with the notes of the claims adjusters, with the fourth model, to determine first meanings associated with the notes of the claims adjusters;
process the feature data associated with the vehicle accident descriptions, with the fourth model, to determine second meanings associated with the vehicle accident descriptions; and
compare the first meanings and the second meanings to determine the contradiction data identifying the contradictions in the feature data.

12. The device of claim 8, wherein the one or more processors, when processing the weather data, the location data, and the telematics data, with the fifth model, to determine the actual weather conditions and the actual locations associated with the vehicle accidents, are configured to:
process the weather data, the location data, and the telematics data, with the fifth model, to generate a co-occurrence matrix;
determine the actual weather conditions and the actual locations associated with the vehicle accidents based on the co-occurrence matrix; and
determine frequencies of the vehicle accidents based on the actual weather conditions and the actual locations.

13. The device of claim 8, wherein the telematics data includes data identifying one or more of:
vehicle accelerations exceeding an acceleration threshold,
vehicle braking conditions exceeding a braking threshold, or
vehicle cornering conditions exceeding a cornering threshold.

14. The device of claim 8, wherein the one or more processors, when performing the one or more actions, are configured to:
utilize convolutional autoencoders to determine a reconstructed fraud ring;
compare data identifying the fraud ring and data identifying the reconstructed fraud ring; and
determine whether the fraud ring is valid based on comparing the data identifying the fraud ring and the data identifying the reconstructed fraud ring.

15. A non-transitory computer-readable medium storing instructions, the instructions comprising:
one or more instructions that, when executed by one or more processors, cause the one or more processors to:
receive input data associated with vehicle insurance claims;
process claims data, social media data, treatment data, and repair shop data, of the input data, with a long short-term memory model and a conditional random field model, to resolve ambiguities in the input data and to generate resolved data,
wherein the one or more instructions, that cause the one or more processors to process the claims data, the social media data, the treatment data, and the repair shop data, cause the one or more processors to:
predict classifications associated with entities identified in the claims data, the social media data, the treatment data, and the repair shop data based on determining a particular word within a threshold quantity of words,
generate a co-resolution matrix based on the entities and the classifications,
determine a value for the co-resolution matrix, based on a Levenshtein distance between a first named entity, of the entities, and a second named entity, of the entities, based on a minimum quantity of single character edits required to cause the first named entity and the second named entity to match,
determine an ambiguity, of the ambiguities, exists between the first named entity and the second named entity based on the Levenshtein distance, and resolve the ambiguity based on replacing the first named entity or the second named entity with a common identifier;
process the resolved data, with a neural network model, to generate related data identifying relations between persons and vehicle accidents;
perform natural language processing on notes of claims adjusters and vehicle accident descriptions, of the resolved data, to extract feature data identifying features;
process the feature data, with a convolutional neural network (CNN) model, to determine contradiction data identifying contradictions in the feature data;
process weather data, location data, and telematics data, of the input data, with a graph-based entropy model, to determine actual weather conditions and actual locations associated with the vehicle accidents;
process the related data, the contradiction data, and data identifying the actual weather conditions and the actual locations associated with the vehicle accidents, with a graph CNN model and a graph-based attention network model, to generate a knowledge graph;
identify, based on the knowledge graph, a fraud ring associated with two or more persons;
utilize convolutional autoencoders to determine a reconstructed fraud ring;
compare data identifying the fraud ring and data identifying the reconstructed fraud ring; and
determine whether the fraud ring is valid based on comparing the data identifying the fraud ring and the data identifying the reconstructed fraud ring.

16. The non-transitory computer-readable medium of claim 15, wherein the one or more instructions, when executed by the one or more processors, further cause the one or more processors to one or more of:
cause one or more insurance claims associated with the fraud ring to be denied;
notify one or more law enforcement agencies about the fraud ring;
notify one or more vehicle insurance companies about the fraud ring;
cause one or more vehicles associated with the two or more persons of the fraud ring to be disabled; or
retrain one or more of the long short-term memory model, the conditional random field model, the neural network model, the CNN model, the graph-based entropy model, the graph CNN model, or the graph-based attention network model based on the data identifying the fraud ring.

17. The non-transitory computer-readable medium of claim 15, wherein the one or more instructions, that cause the one or more processors to process the claims data, the social media data, the treatment data, and the repair shop data, of the input data, with the long short-term memory model and the conditional random field model, to resolve the ambiguities in the input data and to generate the resolved data, cause the one or more processors to:
process the claims data, the social media data, the treatment data, and the repair shop data, of the input data, with the long short-term memory model and the conditional random field model, to identify persons involved in vehicle insurance claims; and
process data identifying the persons involved in the vehicle insurance claims, with a Levenshtein distance model and a bidirectional long short-term memory model, to resolve the ambiguities in the input data and to generate the resolved data.

18. The non-transitory computer-readable medium of claim 15, wherein the one or more instructions, when executed by the one or more processors, further cause the one or more processors to:
perform natural language processing on the social media data to extract additional features for the feature data.

19. The non-transitory computer-readable medium of claim 15, wherein the one or more instructions, that cause the one or more processors to process the feature data, with the CNN model, to determine the contradiction data identifying the contradictions in the feature data, cause the one or more processors to:
process the feature data associated with the notes of the claims adjusters, with the CNN model, to determine first meanings associated with the notes of the claims adjusters;
process the feature data associated with the vehicle accident descriptions, with the CNN model, to determine second meanings associated with the vehicle accident descriptions; and
compare the first meanings and the second meanings to determine the contradiction data identifying the contradictions in the feature data.

20. The non-transitory computer-readable medium of claim 15, wherein the one or more instructions, that cause the one or more processors to process the weather data, the location data, and the telematics data, with the graph-based entropy model, to determine the actual weather conditions and the actual locations associated with the vehicle accidents, cause the one or more processors to:
process the weather data, the location data, and the telematics data, with the graph-based entropy model, to generate a co-occurrence matrix;
determine the actual weather conditions and the actual locations associated with the vehicle accidents based on the co-occurrence matrix; and
determine frequencies of the vehicle accidents based on the actual weather conditions and the actual locations.

* * * * *